United States Patent
Hua et al.

(10) Patent No.: US 10,261,323 B2
(45) Date of Patent: *Apr. 16, 2019

(54) COMPACT EYE-TRACKED HEAD-MOUNTED DISPLAY

(71) Applicants: ARIZONA BOARD OF REGENTS ON BEHALF OF THE UNIVERSITY OF ARIZONA, Tucson, AZ (US); AUGMENTED VISION, INC, Tucson, AZ (US)

(72) Inventors: Hong Hua, Tuscon, AZ (US); Chunyu Gao, Tuscon, AZ (US)

(73) Assignees: THE ARIZONA BOARD OF REGENTS ON BEHALF OF THE UNIVERSITY OF ARIZONA, Tucson, AZ (US); AUGMENTED VISION INC, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,134

(22) Filed: Mar. 1, 2017

(65) Prior Publication Data

US 2017/0184856 A1    Jun. 29, 2017

Related U.S. Application Data

(63) Continuation of application No. 14/372,292, filed as application No. PCT/US2013/022918 on Jan. 24, 2013, now Pat. No. 9,606,360.

(Continued)

(51) Int. Cl.
*G02B 27/01* (2006.01)
*G02B 5/04* (2006.01)

(Continued)

(52) U.S. Cl.
CPC .......... *G02B 27/0172* (2013.01); *G02B 5/04* (2013.01); *G02B 17/086* (2013.01);
(Continued)

(58) Field of Classification Search
CPC .. G09G 3/346; G02B 27/017; G02B 27/0172; G02B 27/0101; G06F 3/013
See application file for complete search history.

(56) References Cited

U.S. PATENT DOCUMENTS

| 3,632,184 A | 1/1972 | King |
| 5,109,469 A | 4/1992 | Duggan |

(Continued)

FOREIGN PATENT DOCUMENTS

| EP | 0408344 | 1/1991 |
| JP | H09297282 | 11/1997 |

(Continued)

OTHER PUBLICATIONS

Kuiper et al., "Variable-Focus Liquid Lens for Miniature Cameras," Applied Physics Letters 85:1128-1130 (2004).

(Continued)

*Primary Examiner* — Ricardo Osorio
(74) *Attorney, Agent, or Firm* — Niels Haun; Dann, Dorfman, Herrell & Skillman, P.C.

(57) ABSTRACT

Eye-tracked head-mounted displays are provide which, in one aspect, may utilize the same optics for eyetracking and image viewing, with a selected portion of the optics used for an eyetracking optical path and a selected portion of the display optics used for an image viewing optical path.

24 Claims, 14 Drawing Sheets

Related U.S. Application Data

(60) Provisional application No. 61/632,441, filed on Jan. 24, 2012, provisional application No. 61/687,607, filed on Apr. 27, 2012, provisional application No. 61/699,493, filed on Sep. 11, 2012.

(51) Int. Cl.
  G02B 17/08 (2006.01)
  G06F 3/01 (2006.01)
  G02B 27/00 (2006.01)

(52) U.S. Cl.
  CPC ..... *G02B 17/0896* (2013.01); *G02B 27/0093* (2013.01); *G02B 27/017* (2013.01); *G06F 3/013* (2013.01); *G02B 2027/011* (2013.01); *G02B 2027/0138* (2013.01); *G02B 2027/0187* (2013.01)

(56) References Cited

U.S. PATENT DOCUMENTS

| | | | |
|---|---|---|---|
| 5,436,763 | A | 7/1995 | Chen |
| 5,880,711 | A | 3/1999 | Tamada |
| 6,239,915 | B1* | 5/2001 | Takagi ............... G02B 27/017 359/629 |
| 6,396,639 | B1 | 5/2002 | Togino |
| 6,646,811 | B2* | 11/2003 | Inoguchi ............ G02B 17/0812 359/630 |
| 6,653,989 | B2* | 11/2003 | Nakanishi ........... G02B 27/017 345/102 |
| 7,405,881 | B2* | 7/2008 | Shimizu .................. G02B 5/32 345/7 |
| 7,522,344 | B1* | 4/2009 | Curatu ............... G02B 27/0093 345/8 |
| 9,182,600 | B2* | 11/2015 | Ishida ............... G02B 27/0172 |
| 9,737,209 | B2* | 8/2017 | Gramatikov ....... G06K 9/00604 |
| 9,874,760 | B2 | 1/2018 | Hua |
| 2002/0063913 | A1 | 5/2002 | Nakamura |
| 2004/0136097 | A1 | 7/2004 | Park |
| 2004/0164927 | A1 | 8/2004 | Suyama |
| 2004/0218243 | A1 | 11/2004 | Yamazaki |
| 2004/0233551 | A1 | 11/2004 | Takahashi |
| 2005/0179868 | A1 | 8/2005 | Seo |
| 2007/0109505 | A1 | 5/2007 | Kubara |
| 2008/0036853 | A1 | 2/2008 | Shestak |
| 2010/0091027 | A1 | 4/2010 | Oyama |
| 2010/0208372 | A1 | 8/2010 | Heimer |
| 2010/0271698 | A1 | 10/2010 | Kessler |
| 2010/0289970 | A1 | 11/2010 | Watanabe |
| 2012/0013988 | A1 | 1/2012 | Hutchin |
| 2012/0050891 | A1 | 3/2012 | Seidl |
| 2012/0242697 | A1 | 9/2012 | Border |
| 2013/0100524 | A1 | 4/2013 | Magarill |
| 2013/0222896 | A1 | 8/2013 | Komatsu |
| 2013/0285885 | A1 | 10/2013 | Nowatzyk |
| 2014/0300869 | A1 | 10/2014 | Hirsch |
| 2015/0168802 | A1 | 6/2015 | Bohn |
| 2015/0212321 | A1 | 7/2015 | Zhao |
| 2015/0277129 | A1 | 10/2015 | Hua |
| 2015/0363978 | A1 | 12/2015 | Maimone |
| 2016/0085075 | A1 | 3/2016 | Cheng |
| 2016/0239985 | A1 | 8/2016 | Haddick et al. |
| 2016/0320620 | A1 | 11/2016 | Maimone |
| 2017/0202633 | A1 | 7/2017 | Liu |
| 2018/0045949 | A1 | 2/2018 | Hua |

FOREIGN PATENT DOCUMENTS

| | | |
|---|---|---|
| JP | H1013861 | 1/1998 |
| JP | H10307263 | 11/1998 |
| JP | 2001013446 | 1/2001 |
| JP | 2001145127 | 5/2001 |
| JP | 2001238229 | 8/2001 |
| JP | 2002148559 | 5/2002 |
| JP | 20030241100 | 8/2003 |
| JP | 2007101930 | 4/2007 |
| JP | 2014505381 | 2/2014 |
| WO | 2012064546 | 5/2012 |
| WO | 2015134740 | 9/2015 |
| WO | 201603317 | 3/2016 |
| WO | 2018052590 | 3/2018 |

OTHER PUBLICATIONS

Kuribayashi, et al., "A Method for Reproducing Apparent Continuous Depth in a Stereoscopic Display Using "Depth-Fused 3D" Technology" Journal of the Society for Information Display 14:493-498 (2006).

L. G. Brown's: 'Applications of the Sensics panoramic HMD' SID Symposium Digest vol. 39, 2008, p. 77.

Laurence R. Young, David Sheena, "Survey of eye movement recording methods", Behavior Research Methods & Instrumentation, 7(5), 397-429, 1975.

Liu et al., 'A Novel Prototype for an Optical See-Through Head-Mounted Display with Addressable Focus Cues,' IEEE Transactions on Visualization and Computer Graphics 16:381-393 (2010).

Liu et al., "A Systematic Method for Designing Depth-Fused Multi-Focal Plane Three-Dimensional Displays," Optics Express 18:11562-11573 (2010).

Liu et al., "An Optical See-Through head Mounted Display with Addressable Focal Planes," IEEE Computer Society, pp. 33-42 (2008).

Liu et al., "Time-Multiplexed Dual-Focal Plane Head-Mounted Display with a Liquid Lens," Optics Letters 34:1642-1644 (2009).

Loschky, L.C. and Wolverton, G.S., "How late can you update gaze-contingent multiresolutional displays without detection?" ACM Trans. Mult. Comp. Comm. and App. 3, Nov. 2007.

Love et al. (High Speed switchable lens enables the development of a volumetric stereoscopic display. Aug. 2009, Optics Express. vol. 17, No. 18, pp. 15716-15725.).

M. Marti-nez-Corral, H. Navarro, R. Mart??-nez-Cuenca, G. Saavedra, and B. Javidi, "Full parallax 3-D TV with programmable display parameters," Opt. Phot. News 22, 50-50 (2011).

M. D. Missig and G. M. Morris, "Diffractive optics applied to eyepiece design," Appl. Opt. 34, 2452-2461 (1995).

M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.

M. Gutin: 'Automated design and fabrication of ocular optics' Proc. SPIE 2008, p. 7060.

M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.

M. Lucente, "Interactive three-dimensional holographic displays: seeing the future in depth," Computer Graphics, 31(2), pp. 63-67, 1997.

McQuaide et al., "A Retinal Scanning Display System That Produces Multiple Focal Planes with a Deformable Membrane Mirror," Displays 24:65-72 (2003).

Mon-Williams et al., "Binocular Vision in a Virtual World: Visual Deficits Following the Wearing of a Head-Mounted Display," Ophthalmic Physiol. Opt. 13:387-391 (1993).

O. Cakmakci, B. Moore, H. Foroosh, and J. P. Rolland, "Optimal local shape description for rotationally non-symmetric optical surface design and analysis," Opt. Express 16, 1583-1589 (2008).

Optical Research Associates, http://www.opticalres.com, 2 pages (obtained Jan. 26, 2011).

P. A. Blanche, et al, "Holographic three-dimensional telepresence using large-area photorefractive polymer", Nature, 468, 80-83, Nov. 2010.

P. Gabbur, H. Hua, and K. Barnard, 'A fast connected components labeling algorithm for real-time pupil detection,' Mach. Vision Appl., 21(5):779-787, 2010.

R. MartÃ?Â-nez-Cuenca, H. Navarro, G. Saavedra, B. Javidi, and M. MartÃ?Â-nez-Corral, "Enhanced viewing-angle integral imag-

(56) References Cited

OTHER PUBLICATIONS ing by multiple-axis telecentric relay system," Optics Express, vol. 15, Issue 24, pp. 16255-16260, Nov. 21, 2007.
R. Schulein, C. Do, and B. Javidi, "Distortion-tolerant 3D recognition of underwater objects using neural networks," Journal of Optical Society of America A, vol. 27, No. 3, pp. 461-468, Mar. 2010.
R. Schulein, M. DaneshPanah, and B. Javidi, "3D imaging with axially distributed sensing," Journal of Optics Letters, vol. 34, Issue 13, pp. 2012-2014, Jul. 1, 2009.
R.J. Jacob, "The use of eye movements in human-computer interaction techniques: what you look at is what you get", ACM Transactions on Information Systems, 9(2), 152-69, 1991.
Reingold, E.M., L.C. Loschky, G.W. McConkie and D.M. Stampe, "Gaze-contingent multiresolutional displays: An integrative review," Hum. Factors 45, 307-328 (2003).
Rolland, J. P., A. Yoshida, L. D. Davis and J. H. Reif, "High-resolution inset head-mounted display," Appl. Opt. 37, 4183-93 (1998).
Rolland et al., "Multifocal Planes Head-Mounted Displays," Applied Optics 39:3209-3215 (2000).
S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.
S. Hong, J. Jang, and B. Javidi,"Three-dimensional volumetric object reconstruction using computational integral imaging," Journal of Optics Express, on-line Journal of the Optical Society of America, vol. 12, No. 3, pp. 483-491, Feb. 9, 2004.
S. Hong and B. Javidi, "Distortion-tolerant 3D recognition of occluded objects using computational integral imaging," Journal of Optics Express, vol. 14, Issue 25, pp. 12085-12095, Dec. 11, 2006.
S. Kishk and B. Javidi, "Improved Resolution 3D Object Sensing and Recognition using time multiplexed Computational Integral Imaging," Optics Express, on-line Journal of the Optical Society of America, vol. 11, No. 26, pp. 3528-3541, Dec. 29, 2003.
Schowengerdt, B. T., and Seibel, E. J., "True 3-D scanned voxel displays using single or multiple light sources," Journal of SID, 14(2), pp. 135-143, 2006.
Schowengerdt et al., "True 3-D Scanned Voxel Displays Using Single or Multiple Light Sources," J. Soc. Info. Display 14:135-143 (2006).
Sheedy et al., "Performance and Comfort on Near-Eye Computer Displays," Optometry and Vision Science 79:306-312 (2002).
Shibata et al., "Stereoscopic 3-D Display with Optical Correction for the Reduction of the Discrepancy Between Accommodation and Convergence," Journal of the Society for Information Display 13:665-671 (2005).
Shiwa et al., "Proposal for a 3-D Display with Accommodative Compensation: 3DDAC," Journal of the Society for Information Display 4:255-261 (1996).
Sullivan, "A Solid-State Multi-Planar Volumetric Display," SID Symposium Digest of Technical Papers 34:354-356 (2003).
Suyama, S., Ohtsuka, S., Takada, H., Uehira, K., and Sakai, S., "Apparent 3D image perceived from luminance-modulated two 2D images displayed at different depths," Vision Research, 44: 785-793, 2004.
T. Okoshi, "Optimum design and depth resolution of lens-sheet and projection-type three-dimensional displays," Appl. Opt. 10, 2284-2291 (1971).
T. Ando, K. Yamasaki, M. Okamoto, and E. Shimizu, "Head Mounted Display using holographic optical element," Proc. SPIE, vol. 3293, 183 (1998).
Tibor Balogh, "The HoloVizio System," Proceedings of SPIE, VOl 6055, 2006.
Varioptic, "Video Auto Focus and Optical Image Stabilization," http://vvww.varioptic.com/en/home.html, 2 pages (2008).
Wann et al., Natural Problems for Stereoscopic Depth Perception in Virtual Environments, Vision Res. 35:2731-2736 (1995).
Wartenberg, Philipp, "EyeCatcher, the Bi-directional OLED Microdisplay," Proc. of SID 2011.
Watt et al., "Focus Cues Affect Perceived Depth," J Vision 5:834-862 (2005).
Written Opinion dated Feb. 10, 2011 from PCT/CN2010/072376.
Written Opinion dated Jun. 18, 2010 in corresponding international application PCT/US2010/031799.
X. Hu and H. Hua, "Design and assessment of a depth-fused multi-focal-plane display prototype," Journal of Display Technology, Dec. 2013.
Xiao Xiao, Bahram Javidi, Manuel Martinez-Corral, and Adrian Stern , "Advances in Three-Dimensional Integral Imaging: Sensing, Display, and Applications," Applied Optics, 52(4):. 546-560,2013.
Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).
Xinda Hu and Hong Hua, "High-resolution optical see-through multi-focal-plane head-mounted display using freeform optics," Optics Express,22(11): 13896-13903, Jun. 2014.
Y. Takaki, Y. Urano, S. Kashiwada, H. Ando, and K. Nakamura, "Super multi-view winshield display for long-distance image information presentation," Opt. Express, 19, 704-16, 2011.
Yamazaki et al, "Thin wide-field-of-view HMD with free-form-surface prism and applications", Proc. SPIE 3639, Stereoscopic Displays and Virtual Reality Systems VI, 453 (May 24, 1999).
Yano, S., Emoto, M., Mitsuhashi, T., and Thwaites, H., "A study of visual fatigue and visual comfort for 3D HDTV/HDTV images," Displays, 23(4), pp. 191-201, 2002.
European Search Report dated Apr. 28, 2016 from EP application 13847218.8.
Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.
Hu and Hua, "Design and tolerance of a freeform optical system for an optical see-through multi-focal plane display," Applied Optics, 2015.
A. Yabe, "Representation of freeform surface suitable for optimization," Applied Optics, 2012.
Armitage, David, Ian Underwood, and Shin-Tson Wu. Introduction to Microdisplays. Chichester, England: Wiley, 2006.
Hoshi, et al, "Off-axial HMD optical system consisting of aspherical surfaces without rotational symmetry," Proc. SPIE 2653, Stereoscopic Displays and Virtual Reality Systems III, 234 (Apr. 10, 1996).
G. Wetzstein et al., "Tensor Displays: Compressive light field synthesis using multilayer displays with directional backlighting," ACM Transactions on Graphics, 31(4), 2012.
S. Feiner, 2002, "Augmented reality: A new way of seeing," Scientific American, No. 54, 2002.
K. Ukai and P.A. Howardth, "Visual fatigue caused by viewing stereoscopic motion images: background, theories, and observations," Displays, 29(2), pp. 106-116, 2008.
B. T. Schowengerdt, M. Murari, E. J. Seibel, "Volumetric display using scanned fiber array," SID Symposium Digest of Technical Papers, 2010.
H. Hua and B. Javidi, "A 3D integral imaging optical see-through head-mounted display", Optics Express, 22(11): 13484-13491, 2014.
W. Song, Y. Wang. D. Cheng, Y. Liu, "Light field head-mounted display with correct focus cue using micro structure array," Chinese Optics Letters, 12(6): 060010, 2014.
T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.
Hu, X., Development of the Depth-Fused Multi-Focal Plane Display Technology, Ph.D. Dissertation, College of Optical Sciences, University of Arizona, 2014.
S. Ravikumar, K. Akeley, and M. S. Banks, "Creating effective focus cues in multi-plane 3D displays," Opt. Express 19, 20940-20952, 2011.

(56) References Cited

OTHER PUBLICATIONS

X. Hu and H. Hua, "Design and tolerance of a free-form optical system for an optical see-hrough multi-focal-plane display," Applied Optics, 54(33): 9990-9, 2015.
C. B. Burckhardt, "Optimum parameters and resolution limitation of integral photography," J. Opt. Soc. Am. 58, 71-76 (1968).
C. Manh Do, R. Mart??-nez-Cuenca, and B. Javidi, "Three-dimensional object-distortion-tolerant recognition for integral imaging using independent component analysis," Journal of Optical Society of America A 26, issue 2, pp. 245-251 (Feb. 1, 2009).
Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.
Christopher M. Bishop, Neural Networks for Pattern Recognition, Oxford University Press, Inc. New York, NY 1995.
Curatu, C., J.P. Rolland, and Hong Hua, "Dual purpose lens for an eye-tracked projection head-mounted display," Proceedings of International Optical Design Conference, Vancouver, Canada, Jun. 2006.
D. Cheng, Y.Wang, H. Hua, and M. M. Talha, Design of an optical see-through headmounted display with a low f-number and large field of view using a free-form prism, App. Opt. 48 (14), pp. 2655-2668, 2009.
D. Cheng, Y. Wang, H. Hua, and M. M. Talha, "Design of an optical see-through head-mounted display with a low f-number and large field of view using a freeform prism," Appl. Opt., 48(14):2655-2668, 2009.
D. Cheng, Y. Wang, H. Hua, J. Sasian, "Design of a wide-angle, lightweight head-mounted display using free-form optics tiling," Opt. Lett., 36(11):2098-100, 2011.
D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).
Davis et al., "Accommodation to Large Disparity Stereograms," Journal of AAPOS 6:377-384 (2002).
Downing et al., "A Three-Color, Solid-State, Three-Dimensional Display," Science 273:1185-1189 (1996).
Duchowski, A., "Eyetracking Methodology: theory and practice," Publisher: Springer, 2003.
Duchowski, A. T., and A. Coltekin, "Foveated gaze-contingent displays for peripheral LOD management, 3D visualization, and stereo imaging," ACM Trans. on Mult. Comp., Comm., and App. 3, 1-21, (2007).
Edgar et al., "Visual Accommodation Problems with Head-Up and Helmet-Mounted Displays?," Displays 15:68-75 (1994).
European Search Report dated Aug. 14, 2015 in corresponding EP application 13740989.2.
F. Okano, H. Hoshino, J. Arai y I. Yuyama, "Real-time pickup method for a three-dimensional image based on integral photography," Appl. Opt. 36, 1598-1603 (1997).
Favalora et al., "100 Million-Voxel Volumetric Display," Proc. SPIE 4712:300-312 (2002).
G. Lippmann, "Epreuves reversibles donnant la sensation du relief," Journal of Physics (Paris) 7, 821-825 (1908).
GB Examination Report corresponding to GB 1012165.5 dated Jun. 28, 2011.
Geisler, W.S., J.S. Perry and J. Najemnik, "Visual search: The role of peripheral information measured using gaze-contingent displays," J. Vision 6, 858-873 (2006).
Graham-Rowe, "Liquid Lenses Make a Splash," Nature-Photonics pp. 2-4 (2006).
H. Hua, X. Hu, and C. Gao, "A high-resolution optical see-through head-mounted display with eyetracking capability," . Optics Express, Nov. 2013.
H. Hua, "Sunglass-like displays become a reality with freeform optical technology," SPIE Newsroom, 2012.
H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.
H. Hoshi, N. Taniguchi, H. Morishima, T. Akiyama, S. Yamazaki and A. Okuyama, "Off-axial HMD optical system consisting of aspherical surfaces without rotational symmetry," SPIE vol. 2653, 234 (1996).
H. Hua, C. Pansing, and J.P. Rolland, "Modeling of an eye-imaging system for optimizing illumination schemes in an eye-tracked head-mounted display," Appl. Opt., 46(31):7757-75, Oct. 2007.
H. Hua, P. Krishnaswamy, and J.P. Rolland, 'Video-based eyetracking methods and algorithms in head-mounted displays,' Opt. Express, 14(10):4328-50, May 2006.
Heanue et al., "Volume Holographic Storage and Retrieval of Digital Data," Science 265:749-752 (1994).
Hidenori Kuriyabashi, Munekazu Date, Shiro Suyama, Toyohiko HatadaJ. of the SID 14/5, 2006 pp. 493-498.
Hua, "Merging the Worlds of Atoms and Bits: Augmented Virtual Environments," Optics and Photonics News 17:26-33 (2006).
Hua, H., C. Pansing, and J. P. Rolland, "Modeling of an eye-imaging system for optimizing illumination schemes in an eye-tracked head-mounted display," Applied Optics, 46(32): 1-14, Nov. 2007.
Hua, H. "Integration of eye tracking capability into optical see-through head-mounted displays," Proceedings of SPIE (Electronic Imaging 2001), pp. 496-503, Jan. 2001.
Hua et al, "Compact eyetracked optical see-through head-mounted display", Proc. SPIE 8288, Stereoscopic Displays and Applications XXIII, 82881F (Feb. 9, 2012).
Inoue et al., "Accommodative Responses to Stereoscopic Three-Dimensional Display," Applied Optics, 36:4509-4515 (1997).
International Search Report and Written Opinion dated Nov. 24, 2015 in corresponding PCT application PCT/US2015/047163.
International Search Report dated Feb. 10, 2011 from PCT/CN2010/072376.
International Search Report dated Jan. 29, 2014 in corresponding international application PCT/US2013/065422.
International Search Report dated Jun. 18, 2010 in corresponding international application PCT/US2010/031799.
J. Hong, S. Min, and B. Lee, "Integral floating display systems for augmented reality," Applixed Optics, 51 (18):4201-9, 2012.
J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).
J. Arai, et al., "Depth-control method for integral imaging," Feb. 1, 2008 / vol. 33, No. 3 / Optics Letters.
J. E. Melzer's: 'Overcoming the field-of- view/resolution invariant in head-mounted displays' Proc. SPIE vol. 3362, 1998, p. 284.
J. G. Droessler, D. J. Rotier, "Tilted cat helmet-mounted display," Opt. Eng., vol. 29, 849 (1990).
J. P. Rolland, "Wide-angle, off-axis, see-through head-mounted display," Opt. Eng., vol. 39, 1760 (2000).
J. S. Jang, F. Jin, and B. Javidi, "Three-dimensional integral imaging with large depth of focus by use of real and virtual image fields," Opt. Lett. 28:1421-23, 2003.
J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.
Jisoo Hong, et al., "Three-dimensional display technologies of recent interest: Principles, Status, and Issues," Applied Optics (Dec. 1, 2011) 50(34)106.
K. Iwamoto, K. Tanie, T. T. Maeda, "A head-mounted eye movement tracking display and its image display method", Systems & Computers in Japan, vol. 28, No. 7, Jun. 30, 1997, pp. 89-99. Publisher: Scripta Technica, USA.
K. Iwamoto, S. Katsumata, K. Tanie, "An eye movement tracking type head mounted display for virtual reality system: —evaluation experiments of a prototype system", Proceedings of 1994 IEEE International Conference on Systems, Man, and Cybernetics. Humans, Information and Technology (Cat. No. 94CH3571-5). IEEE. Part vol. 1, 1994, pp. 13-18 vol. 1. New York, NY, USA.
European Examination Report in corresponding EP application 17184977.1.

(56) References Cited

OTHER PUBLICATIONS

Xin et al., "Design of Secondary Optics for IRED in active night vision systems," Jan. 10, 2013, vol. 21, No. 1, Optics Express, pp. 1113-1120.
S. Nikzad, Q. Yu, A. L. Smith, T. J. Jones, T. A. Tombrello, S. T. Elliott, "Direct detection and imaging of low-energy electrons with delta-doped charge-coupled devices," Applied Physics Letters, vol. 73, p. 3417, 1998.
Dewen Cheng et al.; "Large field-of-view and high resolution free-form head-mounted display"; SPIE-OSA/ vol. 7652 Jun. 2018.

\* cited by examiner

COMPACT EYE-TRACKED HEAD-MOUNTED DISPLAY

RELATED APPLICATIONS

This is a continuation application of U.S. application Ser. No. 14/372,292, filed Jul. 15, 2014, which is a 371 application of International Application No. PCT/US2013/022918 filed Jan. 24, 2013, which claims the benefit of priority of U.S. Provisional Application No. 61/632,441, filed on Jan. 24, 2012 and claims the benefit of priority of U.S. Provisional Application No. 61/687,607, filed on Apr. 25, 2012 and claims the benefit of priority of U.S. Provisional Application No. 61/699,493, filed on Sep. 11, 2012, the entire contents of which applications are incorporated herein by reference.

GOVERNMENT LICENSE RIGHTS

This invention was made with government support under contract No. IIS1115489 awarded by the National Science Foundation. The government has certain rights in the invention.

FIELD OF THE INVENTION

The present invention relates generally to eye-tracked head-mounted displays, and more particularly, but not exclusively, to eye-tracked head-mounted displays which may utilize the same optics for eyetracking and image viewing, with a selected portion of the optics used for an eyetracking optical path and a selected portion of the display optics used for an image viewing optical path.

BACKGROUND OF THE INVENTION

Head-mounted display (HMD) technologies have been applied to a wide range of scientific and engineering domains. Examples of applications include flight simulation, scientific visualization, medicine, engineering design, education and training, wearable computing, and entertainment systems. In the domain of augmented reality, HMDs are one of the enabling technologies for merging virtual views with physical scenes, which may enable a physician to see a 3D rendering of the anatomical structures or CT images of a patient superimposed onto the patient's anatomy, such as the abdomen, for example. In the domain of wearable computing, an HMD creates a mobile display solution that offers much more attractive image quality and screen size than other popular mobile platforms such as smart phones and PDAs. In the foreseeable future, such mobile displays may appear as elegant as a pair of sunglasses and may become an integral part of many people's daily activities to retrieve information and connect with people instantly.

In parallel with HMD technologies, various eyetracking technologies have been developed and applied to several disciplines including vision research, human computer interfaces, tele-operation environments, and visual communication. The benefits of eyetracking for multi-modal human-computer interfaces and the technical benefits of data compression have been well-recognized and studied. For instance, multi-resolution gaze-contingent display and image processing schemes have been proposed to effectively save data transmission bandwidth in communication, and improve rendering speed of 3D scenes using foveated level-of-detail management methods, and to achieve wide FOV high-resolution display and imaging systems.

The concept of creating an integrated eyetracked HMD (ET-HMD) system has been explored in various levels. An ET-HMD is able to display monocular or stereoscopic virtual images as a classical HMD does, while additionally tracking the gaze direction of the user. A fully-integrated ET-HMD offers multi-fold benefits, not only to fundamental scientific research but also to emerging applications of such technology. For instance, many research efforts are concerned about how human users perceive and organize spatial information, interact with such information, and navigate within 3D virtual spaces. Eyetracking capability in HMDs adds a very valuable tool and objective metric for scientists to quantitatively assess user interaction with 3D environments and investigate the effectiveness of various 3D visualization technologies for various specific tasks including training, education, and augmented cognition tasks. From the technology point of view, eyetracking capability integrated with HMD systems can be utilized to improve size and depth perception accuracy in stereoscopic displays. Eyetracking capability may help to create solutions to the FOV-resolution tradeoff through a fovea-contingent display scheme and to the accommodation-convergence contradiction by using vari-focal plane display methodology. From the application point of view, an ET-HMD offers unique opportunities for novel interactive interfaces for people with proprioceptive disabilities where eye gaze instead of hands or feet can be used as a method of interaction and communication.

Despite significant advancements and commercial availability of stand-alone HMD and eyetracking technologies, integrating these two stand-alone technologies imposes significant challenges in creating a compact, portable, accurate and robust system. Although several pioneering efforts were made to develop ET-HMD technologies and to optimize these two technologies in a systematic approach, none of the existing technological solutions offers a truly portable, lightweight, and robust system that conforms to the form factor of an eyeglass-style display. For many demanding applications, lightweight and compactness are critical. For instance, to support Amyotrophic Lateral Sclerosis (ALS) patient communication, the integrated system has to be lightweight so that the patients are able to bear the weight with their significantly weakened muscles and very limited mobility.

Over the past decades, many different optical design approaches have been applied to HMD designs to improve the system performance. These methods include applying catadioptric technique, introducing new elements such as aspherical surfaces, using holographic and diffractive optical components, exploring new design principles such as using projection optics to replace an eyepiece or microscope type lens system in a conventional HMD design, and introducing tilt and decenter or even freeform surfaces. Few of these optical design methods are capable of creating a wide field-of-view, compact, and lightweight HMD that is non-intrusive and can be considered as being eyeglass-style near-eye displays. Integrating eyetracking capability to these technologies is very challenging and adds significant weight, volume, and complexity.

Adding eyetracking capability to HMDs started as early as the high resolution inset displays by CAE Corporation. This pioneering work was not intended for mobile compact ET-HMD systems. Also, others used a mechanical driving device to move a high resolution inset in a bench-prototype stereoscopic display. ISCAN Corporation worked to integrate an ISCAN eyetracker into a V8-HMD from Virtual Research Corporation to study software-based fovea-contingent display scheme. This method of integrating commercially available HMDs and eye-trackers is referred to as the functionality integration approach, in which two separate instruments are brought together at a later stage of utilization. Though the functionality integration approach has the advantage of being a simple solution with low development cost, it generally does not take advantage of low-level optimization and lacks the attributes of compactness, accuracy, and robustness.

In contrast to the functionality integration approach, a systematic approach, where the system is conceived and optimized as one single instrument from a fundamental design perspective, has many advantages in creating a fully integrated ET-HMD instrument. The significant benefits of the systematic approach include the ability to explore the design constraints and requirements for both the display and eyetracker units, conceive new solutions, and optimize the designs for a compact and robust system. Pioneering efforts have been made to explore the possibility of a complete integration with low-level optimization. Following these earlier efforts, Hua and Rolland collaboratively pursued a fully integrated design approach, developed robust eyetracking methods and algorithms for an ET-HMD system, and designed an optical see-through ET-HMD optical system based on the concept of head-mounted projection displays. FIG. 1 shows the first-order layout of the ET-HMD optical system, in which the optical system was simplified with ideal lens modules to emphasize the concept and the scale. (Curatu, C., Hong Hua, and J. P. Rolland, "Projection-based head-mounted display with eye-tracking capabilities," Proceedings of the SPIE International Society for Optical Engineering, Vol. 5875, San Diego, USA, August 2005. Curatu, C., J. P. Rolland, and Hong Hua, "Dual purpose lens for an eye-tracked projection head-mounted display," Proceedings of International Optical Design Conference, Vancouver, Canada, June 2006.). The design took a full integration approach and combined most of the optical paths for the display and eyetracking subsystems. The same projection optics was shared for both display and eye imaging functions. The main limitation of this design, however, was that the overall volume of the integrated ET-HMD system, although significantly improved over others, was still bulky and heavy.

The key challenges of creating a truly portable, lightweight, compact ET-HMD solution lies in addressing two cornerstone issues: (1) an optical method that enables the design of an HMD system with an elegant form factor as compelling as a pair of sunglasses, which has been a persistent dream for both technology and application developers; and (2) an optical method that allows the integration of the eyetracking capability without adding significant weight and volume to the system.

SUMMARY OF THE INVENTION

An ET-HMD system using a video-based feature tracking method typically requires at least three unique optical paths: an illumination path, an eye imaging path, and a virtual display path. Through the illumination path the eye is illuminated by typically near infrared light-emitting diodes (NIR LEDs) to create imaging features such as darkened or brightened pupil and/or Purkinje features for tracking. Through the imaging path, an eye image with the tracking features is captured for feature detection and tracking. Through the display path, a virtual image displayed on a miniature display device is created through eyepiece optics for information viewing. One of the innovations of the present invention is an optical scheme that can uniquely combine these three optical paths through the same core optics, which may be an eyepiece, projection lens, or other optics structure.

For example, in one of its aspects, the present invention may use freeform optical technology along with an innovative optical scheme that can uniquely combine eye imaging optics for eyetracking with the display optics for information viewing. (Thus, as used herein in connection with description of the present invention, the terms "display optics" and "imaging optics" may refer to the same physical optics, which physical optics may also be called the "core optics".) Optionally, the eye illumination optics may also be combined. As such, in one of its advantages the present invention avoids the limitation imposed by prior approaches where the optical systems for the HMD and eyetracking paths are treated separately, and where rotationally symmetric optical surfaces are mostly used. However, though possibly more limiting, the optical scheme of integrating eyetracking with HMD disclosed in the present invention is not limited to freeform optics. The core optics for the ET-HMD system in accordance with the present invention can be applied to conventional HMD optics.

In an exemplary configuration, the present invention may provide an eye-tracked head-mounted display comprising a micro-display for generating an image to be viewed by a user; the micro-display may have a display optical path and an exit pupil associated therewith. A first plane may be located at the micro-display and a second plane located at the exit pupil. An image sensor may be configured to receive reflected optical radiation from the second plane reflected from a user's eye, and may have a sensor optical path associated therewith. In addition, the eye-tracked head-mounted display may include display optics disposed in optical communication with the micro-display along the display optical path and in optical communication with the image sensor along the sensor optical path. The display optics may include a selected surface closest to the micro-display and the image sensor and be located relative to the micro-display and image sensor such that the display and image sensor optical paths impinge upon differing respective portions of the selected surface. The display and image sensor optical paths may partially overlap at the selected surface. The display and image sensor optical paths may each comprise respective optical axes at the display optics and image sensor, respectively, which axes may be coaxial or tilted relative to one another. In addition, the eye-tracked head-mounted display may include a stop at the first plane, where the stop has at least one aperture therein disposed at a location along the sensor optical path. Likewise, the eye-tracked head-mounted display may include a stop having at least one aperture therein disposed at a location along the sensor optical path between the sensor and selected surface. In either configuration, the stop or aperture may include a pin-hole like aperture. In one exemplary configuration, the display optics may include a freeform optical element, a rotationally symmetric optical element, and/or a freeform optical prism. The display optics may include an aspheric surface.

In addition, the eye-tracked head-mounted display may include an illumination source for generating optical radiation to illuminate the second plane to effect illumination of the user's eye. The display optics may be configured to collimate the optical radiation from the illumination source. The illumination source may be located in the first plane or at a different location, such as off axis from the optical axis of the display optics.

BRIEF DESCRIPTION OF THE DRAWINGS

The foregoing summary and the following detailed description of exemplary embodiments of the present invention may be further understood when read in conjunction with the appended drawings, in which.

DETAILED DESCRIPTION OF THE INVENTION

Figure 3A:
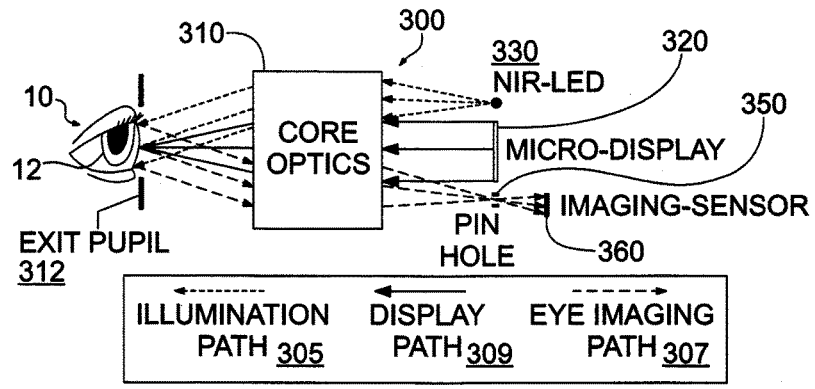
FIG. 3A schematically illustrates an exemplary optical system in accordance with the present invention shown as a monocular optical module.

Referring now to the figures, wherein like elements are numbered alike throughout, FIG. 3A schematically illustrates an exemplary system layout 300 in accordance with the present invention for achieving a compact ET-HMD system. In this exemplary layout 300, the same core optics 310 may serve the functions of eye imaging, display viewing, and/or eye illumination. This simplification stems from an insightful observation on the unique conjugate planes in the eye illumination path 305, eye imaging path 307, and display path 309. In addition, differing portions along the clear aperture of the core optics 310 may be used for the eye illumination path 305, eye imaging path 307, and display path 309. For instance, at a selected surface of the core optics 310 located closest to the micro-display, two or more of the eye illumination path 305, eye imaging path 307, and display path 309 (e.g. eye imaging path 307 and display path 309) can impinge upon differing respective portions of the selected surface, though partial overlap is permitted.

In the display path 309, the core optics 310, which in this context functions as display optics, forms a magnified virtual image of the microdisplay 320 seen by the eye 10. The microdisplay unit 320 can be any type of self-emissive, or illuminated pixel arrays that can serve as an image source, including, but not limited to, a liquid crystal on silicon (LCoS) display device, a liquid crystal display (LCD) panel, an organic light emitting display (OLED), ferroelectric liquid crystal on silicon (FLCoS) device, digital mirror device (DMD), or a micro-projector built upon these aforementioned or other types of micro-display devices, and additional optional optics may be provided between the microdisplay 320 and core optics 310, as desired or required. The magnified virtual image, which may appear to be at an infinite or finite distance from the eye 10, corresponds to the conjugate focal plane of the microdisplay 320. The eye pupil 12 may be co-located with the exit pupil 312 of the display path 309. The chief rays of the display through the center of the pupil 12 (shown in solid lines in FIG. 3A) define the field height on the microdisplay 320, and thus they are separable on the microdisplay surface. In the eye illumination path 305, one or multiple NIR LEDs (near-infrared light-emitting diodes) 330 may be mounted around the microdisplay 320 to illuminate the eye through the display/core optics 310, FIG. 3B. The display/core optics 310 may collimate the LED light and create a uniformly illuminated area on the eye area through multiple virtual LED sources created through the display/core optics 310. Such an off-axis illumination arrangement can create a dark-pupil effect and form multiple glint images of the NIR LEDs 330 through the reflection off the anterior cornea.

In the eye imaging path 307, the eye pupil 12 becomes the object that needs to be imaged. A stop 340 may be placed around the microdisplay 320. Considering the pupil-field relationship of the microdisplay 320 and the eye pupil 12 described earlier, the chief rays of different object fields in the display path become the marginal rays of the on-axis object point in the eye imaging path 307, and thus all the rays through the same point on the eye pupil 12 will be imaged onto the same point on the IR imaging sensor 360. These rays, however, intersect with the microdisplay surface at unique locations. Therefore, in the imaging path 307, a stop 340 is properly designed and placed around the microdisplay 320 such that it does not affect the display path 309 and yet is sufficient to collect rays to form eye images in the eye imaging path 307. In the illustration shown in FIG. 3B, the stop 340 may be provided in the form of pin-hole like small apertures 350 or may be a selected area surrounding the microdisplay 320. A separate image sensor 360 may be associated with each pin-hole like aperture 350.

As one of its benefits, the optical layout 300 for combining two or three unique optical functions has applicability to virtually all types of optical structures suitable for HMD optics. For instance, an exemplary configuration with a conventional eyepiece optics based on rotationally symmetric optical elements has been designed, as discussed below in connection with FIG. 16.

As to the eyetracking function aspect specifically, several different eyetracking techniques exist that may be used to monitor eye movements, which fall into three categories: electro-oclography, scleral search coil, and various video-based feature tracking approaches. Among these methods, video-based feature tracking, which detects and tracks features in captured eye images, can be the least intrusive and most convenient approach to track eye movement.

Figure 1:
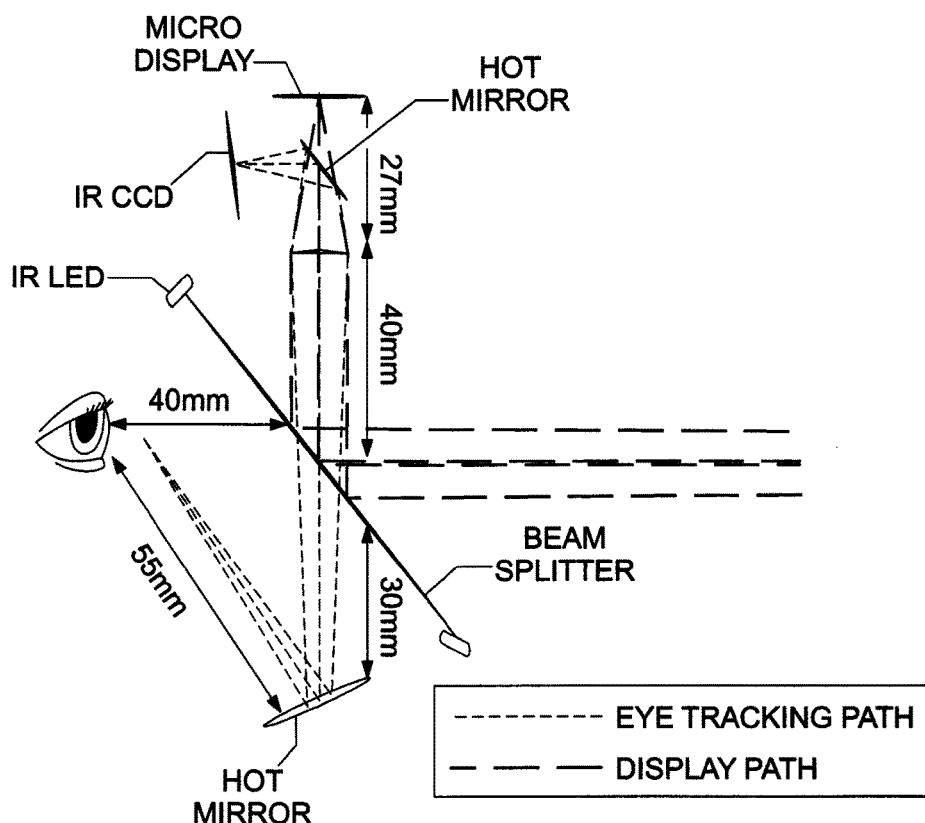
FIG. 1 schematically illustrates a conventional eyetracked head-mounted display (ET-HMD) system based on rotationally symmetric optical technology.
Figure 2A:
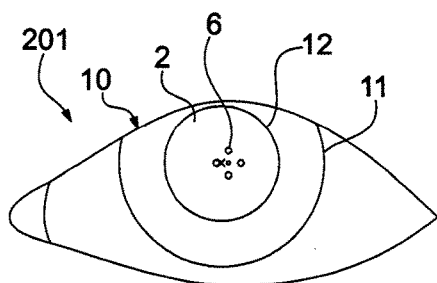
FIGS. 2A, 2B schematically illustrate images from two different IR illumination strategies, with FIG. 2A showing an eye image of a bright eye pupil and four glints resulting from an on-axis illumination strategy where four NIR LEDs are arranged nearly co-axially with the optical axis of the eye imaging optics, and FIG. 2B showing an eye image of a dark eye pupil and four glints resulting from an off-axis illumination strategy where the four NIR LEDs are placed away from the optical axis of the eye imaging optics.
Figure 2B:
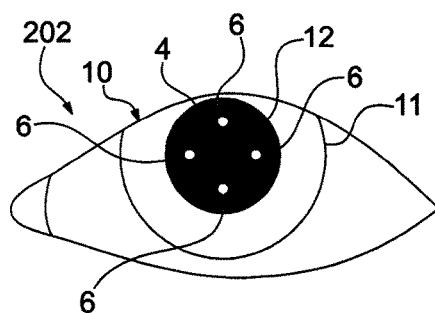

Under near infrared NIR illumination, the eye images 201, 202 typically have two types of features that can be readily identified and measured, FIGS. 2A, 2B. One feature is known as the first Purkinje image, or glint 6, which refers to the reflection image of a point light source formed by the anterior surface of the cornea, FIG. 2B. The second feature is the eye pupil 12. FIGS. 2A-2B demonstrate examples of IR-illuminated eye images 201, 202. Depending on configuration of the IR illuminators, e.g., NIR LEDs 330, an on-axis illumination strategy where the IR illuminators are arranged nearly co-axial with the optical axis of the eye imaging optics leads to a bright pupil 2, FIG. 2A, while an off-axis illumination strategy where the IR illuminators are placed away from the optical axis of the eye imaging optics leads to a darkened pupil 4 with glint(s) 6, FIG. 2B. The pupil and glint features may then be utilized for eye movement tracking.

Among the video-based feature tracking methods, the pupil-corneal reflection tracking method, which relates the eye movements with the vector difference between the pupil center and the glint center, may be a most suitable approach in an ET-HMD system. In this method, one or multiple NIR light emitting diodes (NIR LED), e.g., NIR LEDs 330, may be used to illuminate the eye 10, and the illuminated eye 10 may then imaged by the imaging sensor 360, such as an infrared CCD. The eye pupil 12, the first Purkinje image (or glint), and/or the iris 11 may be tracked simultaneously or separately. Each NIR LED 330 may form a glint 6 or a first Purkinje image. The pupil 12 and first Purkinje features move proportionally with eye rotation and differentially between each other. The differential vector between the two features may be used to determine the point-of-regard of the eye 10. To some extent this method can tolerate helmet slippage in a HMD system, which causes orientation change of the imaging sensor 360 relative to the eye 10 and confuses the eye movements.

Figure 4:
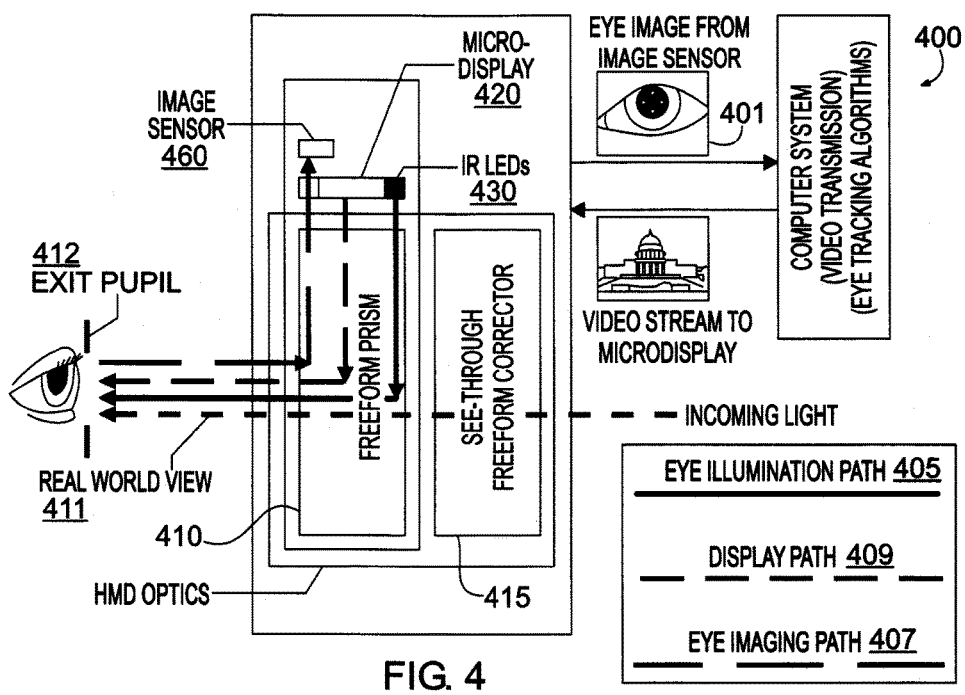
FIG. 4 schematically illustrates a block diagram of an exemplary system based on freeform prism technology in accordance with the present invention shown as a monocular optical module.

In another of its significant aspects, the present invention may utilize freeform optical technology in the core optics 310 to achieve an ultra-compact and lightweight ET-HMD with see-through capability. FIG. 4 shows a block diagram 400 of an exemplary approach to a compact eyetracked HMD design in accordance with the present invention based on freeform optical technology. In one exemplary implementation, a wedge-shaped freeform prism 410 or waveguide-type freeform prism may be used in the core optics 310, which allows the ray paths to be folded within a multi-surface prism structure and helps reduce the overall volume and weight of the display optics when compared with designs using rotationally symmetric elements. Applying freeform optical technology enables full integration of the functions of HMD optics and eyetracking into a compact form. The freeform prism 410 may be made of moldable plastic for lightweight and low cost.

In this approach, the freeform prism 410 may serve two or more unique optical functions. First, the freeform prism 410 may serve as the core element in the eye imaging path 407 that captures NIR-illuminated eye images 401 of a user and tracks eye movements using the captured eye images 401. Unlike a conventional imaging system, which typically employs rotationally symmetrical optical surfaces in the lens construction and typically requires the imaging lenses remain collinear with the detector 460 and the objects to be captured, the freeform prism 410 folds the light path within a single element so that the image detector 460 may be placed on the side of the freeform prism 410. Second, the same freeform prism 410 may serve as display viewing optics for viewing images on the microdisplay 420 in the display path 409. Third, the prism 410 may serve as the core element in the illumination path 305 that collimates the light from one or multiple of the NIR LEDs 430. Alternatively, the NIR LEDs may illuminate the eye area directly without passing through the prism 410 (or core optics 310). In either case, the NIR LEDs 430 may uniformly and non-invasively illuminate the eye area and form critical features (e.g. glints 6 and darkened pupil 4) that are to be imaged for eyetracking. Finally, if an optical see-through ET-HMD system is required for applications where a direct view of the real world is critical, the prism 410 may be cemented with a freeform corrective lens 415. The freeform corrector 415 can correct the viewing axis deviation and undesirable aberrations introduced by the prism 410 and enables see-through capability of the system 400 which offers low peripheral obscurations and minimized distortions to the real-world view 411. Overall, the unique optical scheme of the present invention can enable the combination of the optical paths for the eye imaging 407 and the virtual display 409, and optionally eye illumination 405, through the same freeform prism 410 and can achieve the capabilities of eyetracking and display with minimum hardware cost.

Example 1

A first exemplary configuration 500 in accordance with the present invention utilizes wedge-shaped freeform prism 510 with two reflections, FIGS. 5A-5D. In this embodiment, the freeform prism 510 may serve as many as three core functions: (1) as an illumination optic that collimates the light from one or multiple NIR LEDs 530 to uniformly and non-invasively illuminate the eye area to be imaged; (2) as the core element of an eye imaging optic that captures NIR-illuminated eye images to enable eye movement tracking; and (3) as an eyepiece optic of an HMD system to view images on a microdisplay 520. These three unique optical paths may be combined by the same freeform prism 510 to achieve the capabilities of eyetracking and display. Additionally, the same prism 510 when cemented with a freeform corrective lens enables the see-through capability of an optical see-through HMD system. Alternatively, freeform prism 510 may omit the core function as an illumination optic.

Figure 5A:
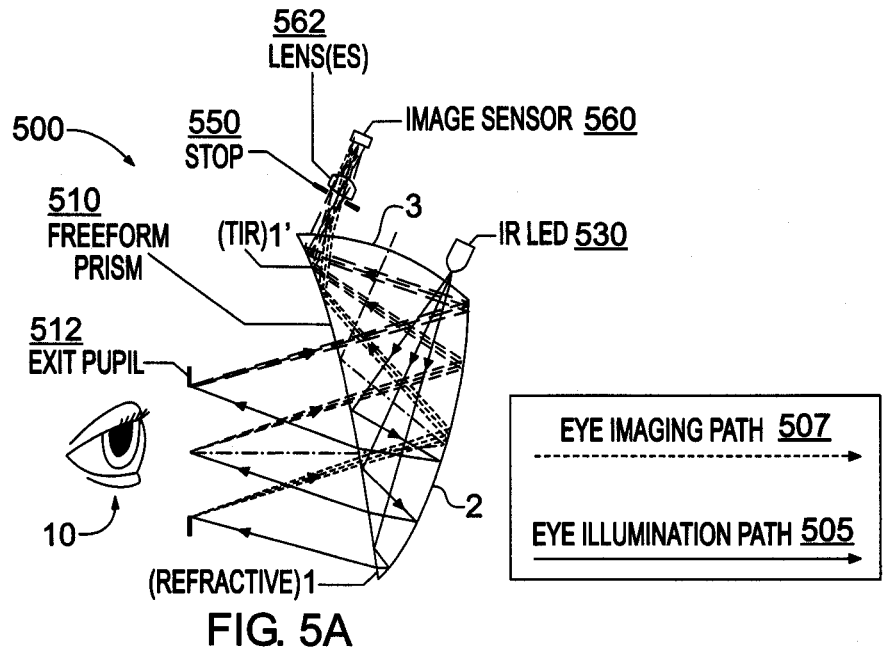
FIGS. 5A-5D schematically illustrate an exemplary design of an optical see-through HMD in accordance with the present invention, with FIG. 5A showing the eye illumination and imaging paths, FIG. 5B showing the virtual display path, FIG. 5C showing a freeform prism shared by eye illumination, eye imaging, and virtual display paths, and FIG. 5D showing a freeform auxiliary lens attached to the freeform prism, which enables see-through capability.

The wedge-shaped freeform prism 510 may include three optical surfaces, at least of one of which may be an aspheric surface with or without rotational symmetry. One innovation of the present invention is the optical approach that can uniquely combine the two or three unique optical paths (i.e., two or more of the eye illumination path 505, eye imaging path 507, and display path 509) via the single freeform prism 510. FIG. 5A shows the schematic design of the eye illumination and imaging optics, which includes freeform prism 510. In the illumination path 505, a ray emitted from an NIR LED 530 is first refracted by the surface 3, followed by two consecutive reflections by the surfaces 1' and 2, and finally is transmitted through the surface 1 and reaches the eye 10. The reflection on surface 1' may satisfy the condition of total internal reflection (TIR). The light emitted by the LEDs 530 may be collimated by the prism 510, yielding a uniform illumination to the eye 10. The NIR illuminated eye 10 may then be imaged by an IR image sensor 560. In the eye imaging path 507, light rays scattered off the eye 10 may be first refracted by the surface 1, followed by two consecutive reflections by the surface 2 and 1', and finally may be transmitted through the surface 3 and reach the sensor 560. Additional lenses 562 may be inserted between the surface 3 of the prism 510 and the image sensor 560 to improve optical performance of the eye imaging. A small-aperture stop 550 may be placed near or inside the lenses 562 to confine the light received by the imaging sensor 560.

Figure 5B:
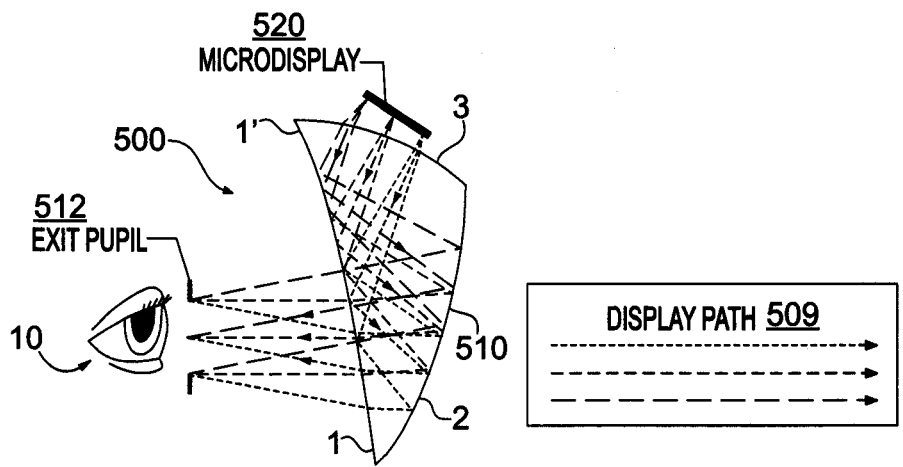

FIG. 5B schematically illustrates the display path 509 of HMD optics using the freeform prism 510 to magnify the image on a microdisplay 520, forming a virtual image at a comfortable viewing distance. A ray emitted from a point on the microdisplay 520 may be first refracted by the surface 3 of the freeform prism 510, followed by two consecutive reflections by the surfaces 1' and 2, and finally may be transmitted through the surface 1 to reach the exit pupil 512 of the system 500. The reflection on surface 1' may satisfy the TIR condition. Rather than requiring multiple elements, the optical path is naturally folded within the prism structure. Additional lenses may be inserted between the surface 3 of the prism 510 and the microdisplay 520 to further improve optical performance of the display path 509.

Figure 5C:
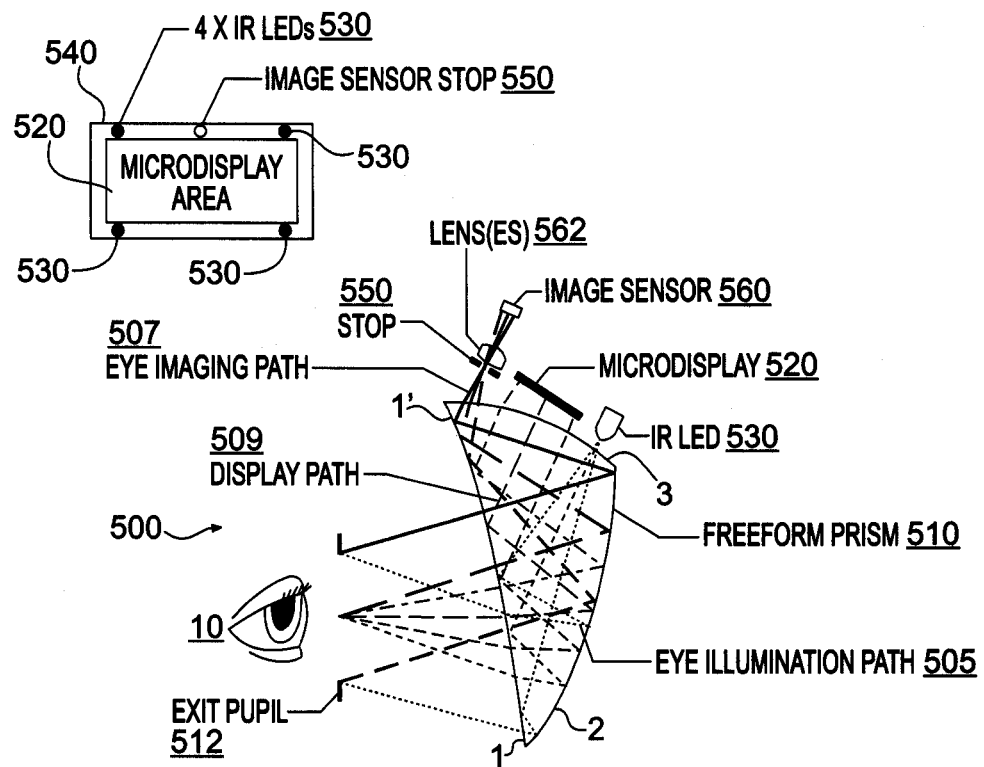

FIG. 5C schematically illustrates the integrated system 500 where the illumination, imaging and display optics comprise the same prism 510 and the illumination LEDs 530 and a pinhole-like stop 550 are placed around the edge 540 of the microdisplay 520 to form a high-quality eye image. One example of the stop and LED configurations is illustrated in FIG. 5C. It is worth noting the stop 550 and LEDs 530 may be placed in other locations at the periphery around in the microdisplay 520. In addition, the stop 550 and LEDs 530 may or may not be co-planar with the microdisplay 520. Additional lenses may be used in one or more of the illumination path 505, eye imaging path 507, and display path 509 to improve the system performance. Moreover, at the surface closest to the microdisplay 520, surface 3, the illumination path 505, eye imaging path 507, and display path 509 may impinge upon differing respective portions of surface 3 (though partial overlap is permitted).

Figure 5D:
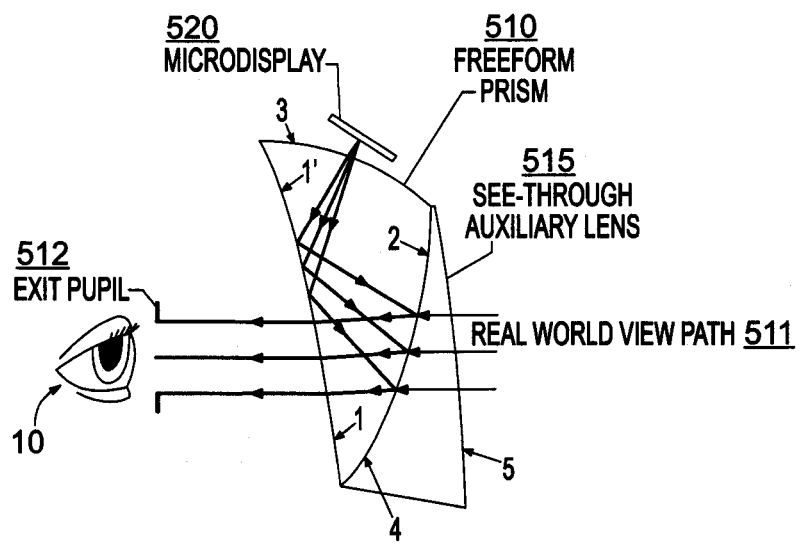

To enable see-through capability, the surface 2 of the prism 510 may be coated as a half mirror. The rays from the microdisplay 520 may be reflected by the surface 2 while the rays from a real-world scene are transmitted. FIG. 5D schematically illustrates a freeform auxiliary lens 515, consisting of two freeform surfaces 4 and 5, cemented with the prism 510 to correct the viewing axis deviation and aberrations introduced by the freeform prism 510 to the real world view path 511. The surface 4 of the auxiliary lens 515 usually has the same prescription as the surface 2 of the prism 510 and the surface 5 of the auxiliary lens 515 is optimized to correct the axis deviation and the aberrations. The auxiliary lens 515 does not noticeably increase the footprint or weight of the overall system. Overall, the exemplary system 500 provides a lightweight, compact, robust, and eyetracked HMD solution with a less obtrusive form factor than any existing HMD approaches can potentially deliver, which is further demonstrated by computer analysis of the design.

Figure 6:
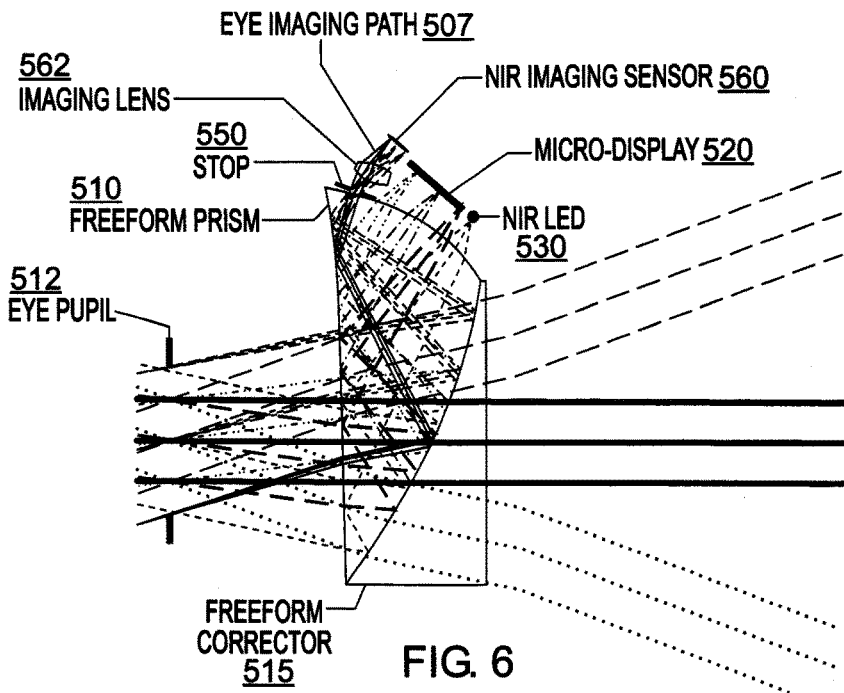
FIG. 6 schematically illustrates an optical layout and raytracing of an exemplary optimized ET-HMD system in accordance with the present invention using the 2-reflection freeform prism structure of FIG. 5D.
Figure 7:
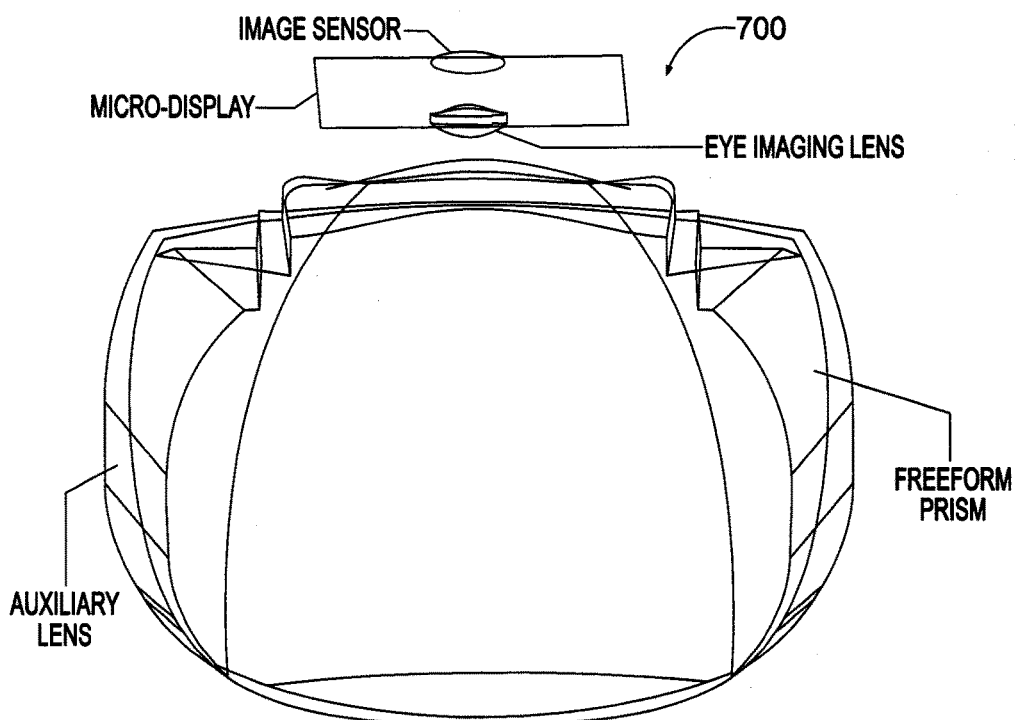
FIG. 7 schematically illustrates a 3D model of an exemplary ET-HMD optical system in accordance with the present invention.
Figure 8:
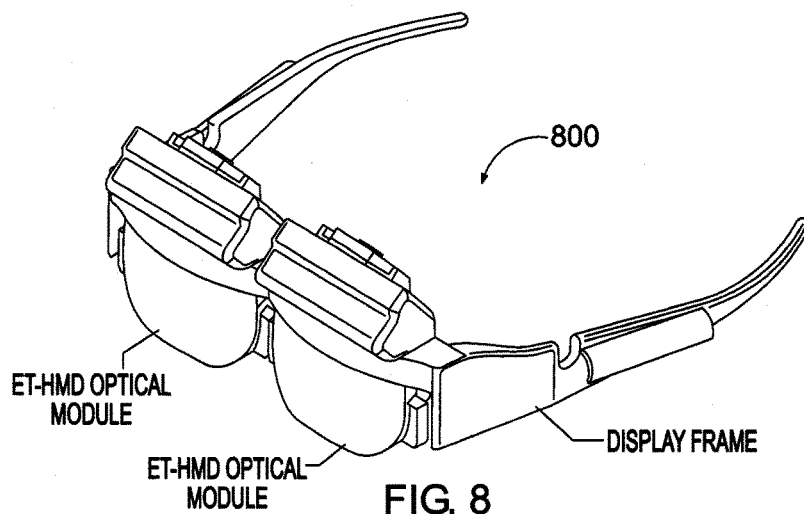
FIG. 8 schematically illustrates a model of an exemplary binocular ET-HMD prototype in accordance with the present invention based on the optical design in FIGS. 6 and 7.
Figure 9A:
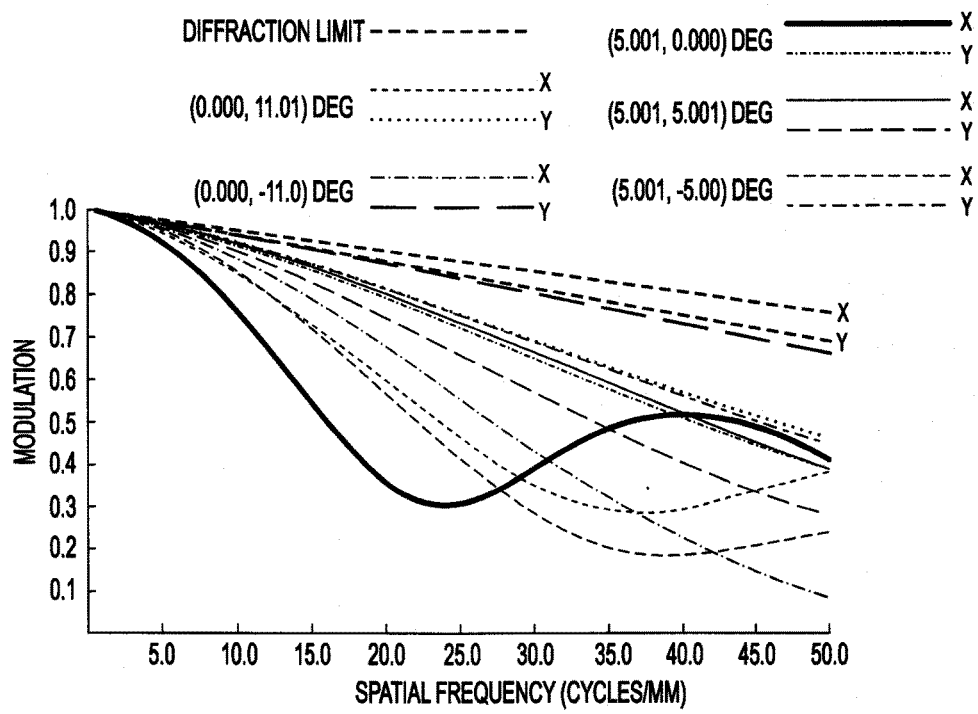
FIGS. 9A-9D illustrate the polychromatic modulation transfer function (MTF) of 20 sampled fields across the field of view in the HMD virtual display path with a 4-mm centered pupil of the design of FIG. 6.
Figure 9B:
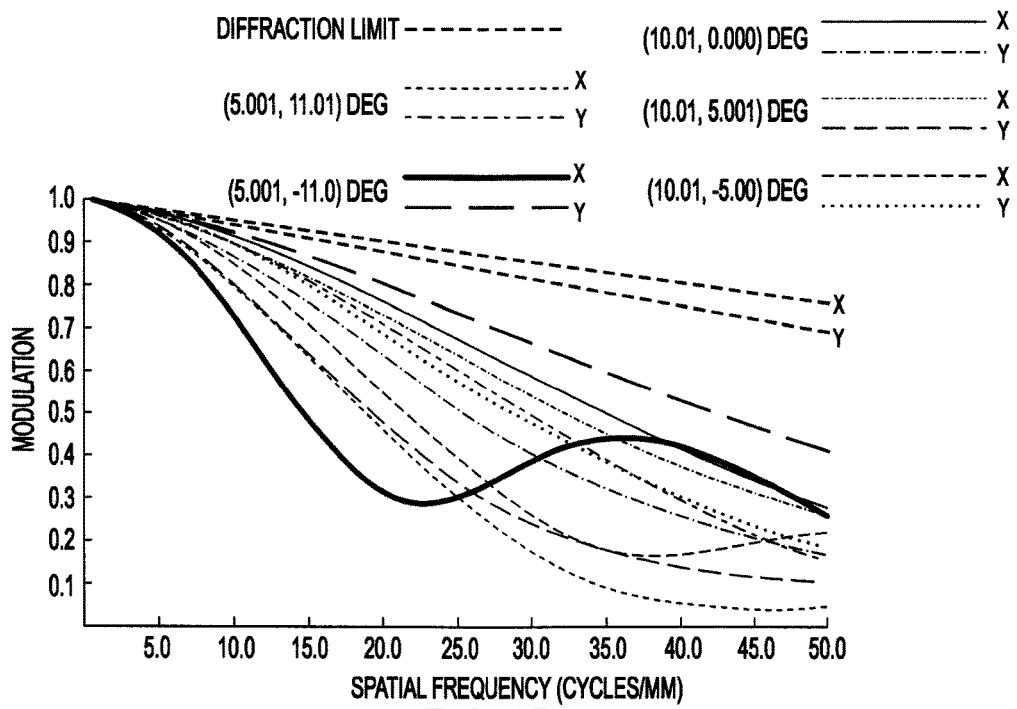
Figure 9C:
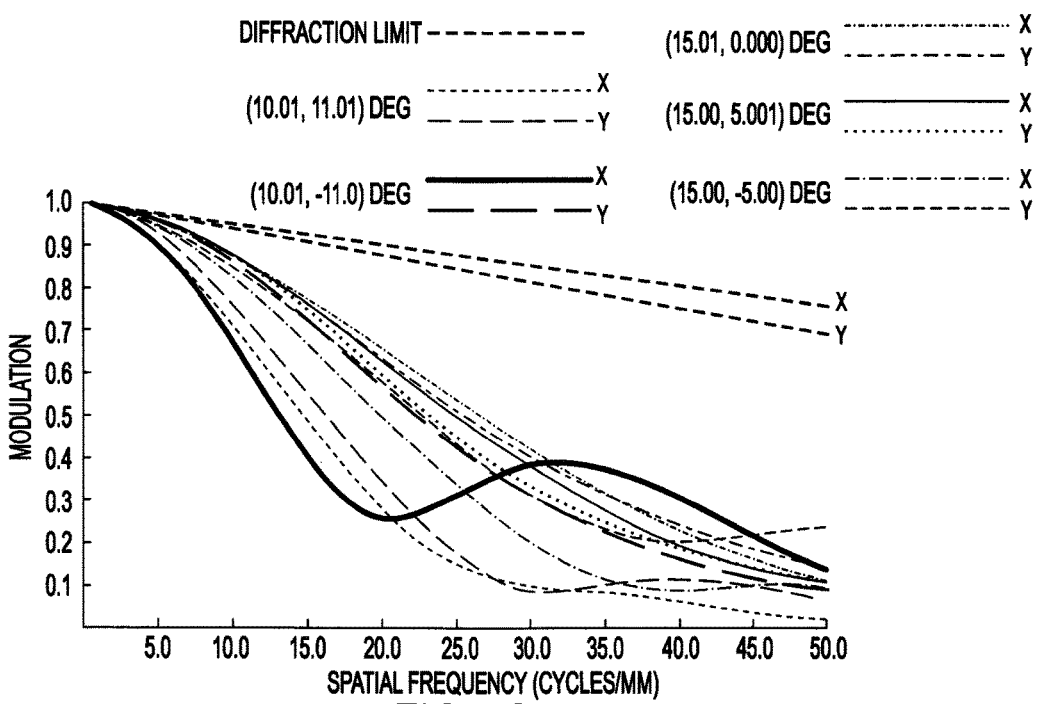
Figure 9D:
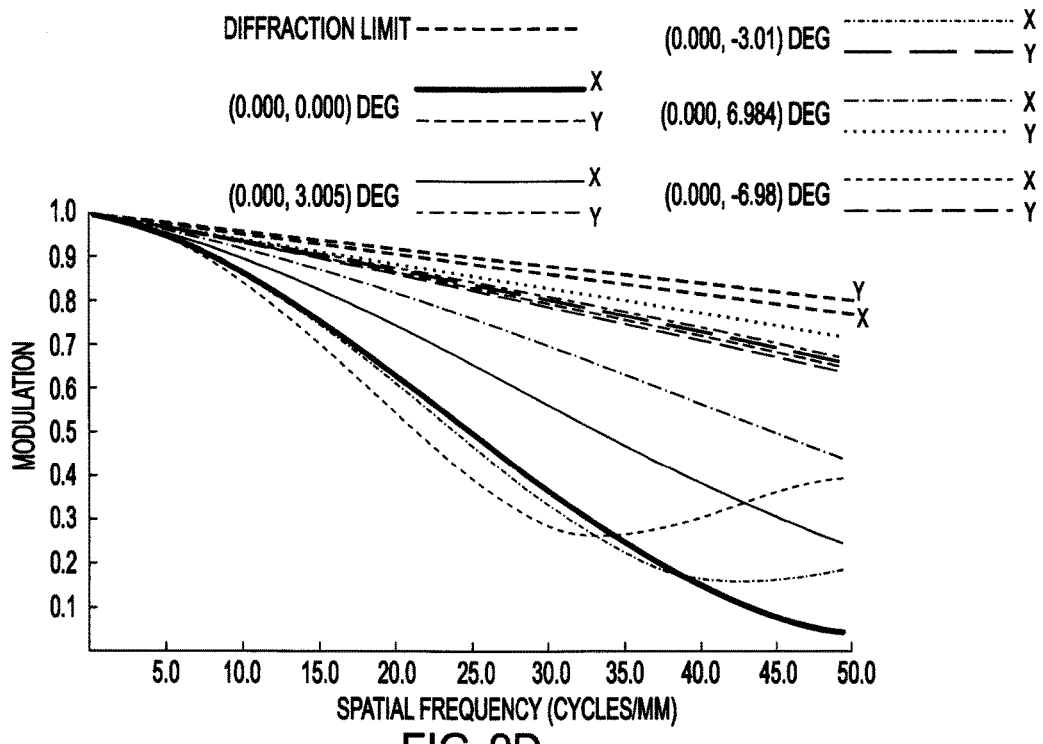

FIG. 6 schematically illustrates the two-dimensional optical layout of an optimized system based on the 2-reflection wedge-shaped freeform prism 510 depicted in FIG. 5. In this implementation, an imaging lens 562 may be used to improve the performance of the eye imaging path 507. The stop 550 may be positioned close to the surface 3 of the prism 510. The NIR-LED(s) 530 may be positioned around the microdisplay 520. FIG. 7 schematically illustrates a 3D model 700 of the exemplary optical system of FIG. 5D, and FIG. 8 schematically illustrates the 3D model of a binocular ET-HMD prototype 800 based on the optical design shown in FIGS. 6 and 7. The specifications of the overall system are listed in Table 1.

TABLE 1

Optical System Specifications

| Parameter | Values |
|---|---|
| Virtual display system | |
| Display FOV | 46° (Diagonal), 40° (Horizontal) × 22° (Vertical) |
| Exit pupil diameter | 10 mm (zero vignette), offer an eyebox of 18 mm for a 4 mm pupil. |
| Eye clearance | 19 mm |
| Display resolution | 1920 × 1200 color pixels |
| Distortion | <8% across FOV |
| Image quality (MTF) | Average 20% at 50 lps/mm and average 30% at 35 lps/mm |
| Design wavelength | 450-650 nm |
| See-through viewing optics | |
| See-through FOV | Approximately 100° (Diagonal), 80° (Horizontal) × 50° (Vertical) |
| Distortion | <10% at the edge and less than 2% at the center |
| Image quality (MTF) | >50% at 0.5 cycles/min and greater than 0.3 at 1 cycles/min |
| Design wavelength | 450-650 nm |
| Eye tracking sub-system | |
| FOV (Imaged eye area) | 30 mm (H) × 20 mm (V) |
| Image quality (MTF) | Average 10% at 50 lps/mm and average 25% at 30 lps/mm |
| Distortion | <5% across the imaged area |
| Design wavelength | 750~900 nm |

An exemplary optical prescription of the freeform prism 510 is listed in the Tables 2-4 for surfaces 1, 2, and 3, respectively. Of the three optical surfaces in the prism 510, the surface 1 is an anamorphic aspheric surface (AAS). The sag of an AAS surface is defined by $$z = \frac{c_x x^2 + c_y y^2}{1 + \sqrt{1 - (1+K_x)c_x^2 x^2 - (1+K_y)c_y^2 y^2}} + $$

-continued $$AR\{(1-AP)x^2 + (1+AP)y^2\}^2 + BR\{(1-BP)x^2 + (1+BP)y^2\}^3 +$$
$$CR\{(1-CP)x^2 + (1+CP)y^2\}^4 + DR\{(1-DP)x^2 + (1+DP)y^2\}^5,$$

where z is the sag of the free-form surface measured along the z-axis of a local x, y, z coordinate system, $c_x$ and $c_y$ are the vertex curvature in x and y axes, respectively, $K_x$ and $K_y$ are the conic constant in x and y axes, respectively, AR, BR, CR and DR are the rotationally symmetric portion of the 4th, 6th, 8th, and 10th order deformation from the conic, AP, BP, CP, and DP are the non-rotationally symmetric components of the 4th, 6th, 8th, and 10th order deformation from the conic.

Surface 2 of the prism 510 may be an XY polynomial surface defined by:

$$z = \frac{c(x^2+y^2)}{1+\sqrt{1-(1+k)c^2(x^2+y^2)}} + \sum_{j=2}^{66} C_j x^m y^n,$$

$$j = [(m+n)^2 + m + 3n]/2 + 1$$

where z is the sag of the free-form surface measured along the z-axis of a local x, y, z coordinate system, c is the vertex curvature (CUY), k is the conic constant, and Cj is the coefficient for $x^m y^n$.

Surface 3 may be an aspheric surface with a rotationally symmetric kinoform diffractive optical element, with the sag of the aspheric surface defined by:

$$z = \frac{cr^2}{1+\sqrt{1-(1+K)c^2r^2}} + Ar^4 + Br^6 +$$
$$Cr^8 + Dr^{10} + Er^{12} + Fr^{14} + Gr^{16} + Hr^{18} + Jr^{20},$$

where z is the sag of the surface measured along the z-axis of a local x, y, z coordinate system, c is the vertex curvature, k is the conic constant, A through J are the 4th, 6th, 8th, 10th, 12th, 14th, 16th, 18th, and 20th order deformation coefficients, respectively.

TABLE 2

Optical surface prescription of surface 1 of the freeform prism

| | |
|---|---|
| X Curvature ($c_x$) | -1.348215E-02 |
| Y Curvature ($c_y$) | 2.004523E-03 |
| Y Conic Constant ($K_Y$) | 0.998125E+01 |
| 4th Order Symmetric Coefficient (AR) | -3.9067945E-06 |
| 6th Order Symmetric Coefficient (BR) | -9.5768964E-17 |
| 8th Order Symmetric Coefficient (CR) | -2.8799927E-15 |
| 10th Order Symmetric Coefficient (DR) | -8.7077963E-16 |
| X Conic Constant ($K_X$) | -1.5687534E+01 |
| 4th Order Asymmetric Coefficient (AP) | -3.2949463E-01 |
| 6th Order Asymmetric Coefficient (BP) | -2.0405356E+02 |
| 8th Order Asymmetric Coefficient (CP) | -8.0782710E+00 |
| 10th Order Asymmetric Coefficient (DP) | -2.72019184E-01 |

TABLE 3

Optical surface prescription of surface 2 of the freeform prism 510

| | |
|---|---|
| Y Curvature | -1.26056882299E-02 |
| Y Radius | -7.93292664201E+01 |
| Conic Constant (SCO K \| C1) | 1.99429650209E+00 |
| X (SCO X \| C2) | 0.00000000000E+00 |
| Y (SCO Y \| C3) | 0.00000000000E+00 |
| X**2 (SCO X2 \| C4) | -2.8963611697E-03 |
| X * Y (SCO XY \| C5) | 0.00000000000E+00 |
| Y**2 (SCO Y2 \| C6) | 5.13151841830E-04 |
| X**3 (SCO Y3 \| C7) | 0.00000000000E+00 |
| X**2 * Y (SCO X2Y \| C8) | -1.6871196613E-05 |
| X Y**2 (SCO XY2 \| C9) | 0.00000000000E+00 |
| Y**3 (SCO Y3 \| C10) | -3.9628025988E-05 |
| X**4 (SCO X4 \| C11) | 5.63763951591E-07 |
| X**3 * Y (SCO X3Y \| C12) | 0.00000000000E+00 |
| X**2 * Y**2 (SCO X2Y2 \| C13) | -5.1451820404E-07 |
| X * Y**3 (SCO XY3 \| C14) | 0.00000000000E+00 |
| Y**4 (SCO Y4 \| C15) | 1.52902584933E-06 |
| X**5 (SCO X5 \| C16) | 0.00000000000E+00 |
| X**4 * Y (SCO X4Y \| C17) | 2.30036831137E-08 |
| X**3 * Y**2 (SCO X3Y2 \| C18) | 0.00000000000E+00 |
| X**2 * Y**3 (SCO X2Y3 \| C19) | 3.82949206634E-08 |
| X * Y**4 (SCO XY4 \| C20) | 0.00000000000E+00 |
| Y**5 (SCO Y5 \| C21) | -9.3057372440E-08 |
| X**6 (SCO X6 \| C22) | -2.3473886032E-09 |
| X**5 * Y (SCO X5Y \| C23) | 0.00000000000E+00 |
| X**4 * Y**2 (SCO X4Y2 \| C24) | -2.4682522624E-09 |
| X**3 * Y**3 (SCO X3Y3 \| C25) | 0.00000000000E+00 |
| X**2 * Y**4 (SCO X2Y4 \| C26) | -3.5764311583E-09 |
| X * Y**5 (SCO XY5 \| C27) | 0.00000000000E+00 |
| Y**6 (SCO Y6 \| C28) | -4.3636504848E-09 |
| X**7 (SCO X7 \| C29) | 0.00000000000E+00 |
| X**6 * Y (SCO X6Y \| C30) | -1.8300632292E-10 |
| X**5 * Y**2 (SCO X5Y2 \| C31) | 0.00000000000E+00 |
| X**4 * Y**3 (SCO X4Y3 \| C32) | -1.0237987168E-10 |
| X**3 * Y**4 (SCO X3Y4 \| C33) | 0.00000000000E+00 |
| X**2 * Y**5 (SCO S2Y5 \| C34) | 2.0693559836E-10 |
| X * Y**6 (SCO XY6 \| C35) | 0.0000000000E+00 |
| Y**7 (SCO Y7 \| C36) | 2.1203645386E-10 |
| X**8 (SCO X8 \| C37) | 2.6638311623E-12 |
| X**7 * Y (SCO X7Y \| C38) | 0.0000000000E+00 |
| X**6 * Y**2 (SCO X6Y2 \| C39) | 4.2552541871E-12 |
| X**5 * Y**3 (SCO X5Y3 \| C40) | 0.00000000000E+00 |
| X**4 * Y**4 (SCO X4Y4 \| C41) | -4.101261981E-12 |
| X**3 * Y**5 (SCO X3Y5 \| C42) | 0.00000000000E+00 |
| X**2 * Y**6 (SCO X2Y6 \| C43) | 3.9696325158E-12 |
| X * Y**7 (SCO XY7 \| C44) | 0.0000000000E+00 |
| Y**8 (SCO Y8 \| C45) | 1.7421792489E-11 |
| X**9 (SCO X9 \| C46) | 0.0000000000E+00 |
| X**8 * Y (SCO X8Y \| C47) | 2.8416565461E-13 |
| X**7 * Y**2 (SCO X7Y2 \| C48) | 0.0000000000E+00 |
| X**6 * Y**3 (SCO X6Y3 \| C49) | 7.7200373777E-13 |
| X**5 * Y**4 (SCO X5Y4 \| C50) | 0.0000000000E+00 |
| X**4 * Y**5 (SCO X4Y5 \| C51) | -6.188783932E-13 |
| X**3 * Y**6 (SCO X3Y6 \| C52) | 0.0000000000E+00 |
| X**2 * Y**7 (SCO X2Y7 \| C53) | 1.7935251959E-14 |
| X * Y**8 (SCO XY8 \| C54) | 0.0000000000E+00 |
| Y**9 (SCO Y9 \| C55) | -1.391093985E-13 |
| X**10 (SCO X10 \| C56) | -2.6923251198E-15 |
| X**9 * Y (SCO X9Y \| C57) | 0.00000000000E+00 |
| X**8 * Y**2 (SCO X8Y2 \| C58) | -1.5546422781E-14 |
| X**7 * Y**3 (SCO X7Y3 \| C59) | 0.00000000000E+00 |
| X**6 * Y**4 (SCO X6Y4 \| C60) | -1.0384073178E-14 |
| X**5 * Y**5 (SCO X5Y5 \| C61) | 0.0000000000E+00 |
| X**4 * Y**6 (SCO X4Y6 \| C62) | 3.8750232363E-14 |
| X**3 * Y**7 (SCO X3Y7 \| C63) | 0.00000000000E+00 |
| X**2 * Y**8 (SCO X2Y8 \| C64) | -3.094245370E-14 |
| X * Y**9 (SCO XY9 \| C65) | 0.000000000E+00 |
| Y**10 (SCO Y10 \| C66) | -3.15607172E-14 |

TABLE 4

Optical surface prescription of surface 3 of the freeform prism 510

| | |
|---|---|
| Y Radius | -1.5000000000E+01 |
| Conic Constant (K) | -8.1715030467E+00 |
| 4th Order Coefficient (A) | -3.5999478362E-05 |
| 6th Order Coefficient (B) | 4.1811989405E-07 |
| 8th Order Coefficient (C) | -2.0382499300E-09 |

TABLE 4-continued

Optical surface prescription of surface 3 of the freeform prism 510

| | |
|---|---|
| 10th Order Coefficient (D) | 3.7498678418E−12 |
| Diffraction Order | 1 |
| Construction Wavelength (nm) | 550 |
| R**2 (HCO C1) | −3.2332326174E−03 |
| R**4 (HCO C2) | 4.1482610496E−05 |
| R**6 (HCO C3) | −4.2185152895E−07 |
| R**8 (HCO C4) | 1.8253428127E−09 |
| R**10 (HCO C5) | −2.7615741244E−12 |

An exemplary optical prescription of surface 5 of the freeform corrector 515 lens is listed in Table 5. Surface 4 of the lens 515 has the same prescription as the surface 2 of the prism 510 and the surface 5 of the lens 515 is an XY polynomial surface defined by the same equation as for surface 2.

TABLE 5

Optical surface prescription of surface 5 of the freeform corrector lens

| | |
|---|---|
| Y Curvature | −4.9680519947E−03 |
| Y Radius | −2.0836485397E+02 |
| Conic Constant (SCO K \| C1) | 9.64085149870E+00 |
| X (SCO X \| C2) | 0.00000000000E+00 |
| Y (SCO Y \| C3) | 0.00000000000E+00 |
| X**2 (SCO X2 \| C4) | −3.7131327715E−03 |
| X * Y (SCO XY \| C5) | 0.00000000000E+00 |
| Y**2 (SCO Y2 \| C6) | 3.49505772747E−03 |
| X**3 (SCO Y3 \| C7) | 0.00000000000E+00 |
| X**2 * Y (SCO X2Y \| C8) | −1.5261510919E−07 |
| X Y**2 (SCO XY2 \| C9) | 0.0000000000E+00 |
| Y**3 (SCO Y3 \| C10) | −9.571153875E−08 |
| X**4 (SCO X4 \| C11) | −1.871425121E−07 |
| X**3 * Y (SCO X3Y \| C12) | 0.000000000E+00 |
| X**2 * Y**2 (SCO X2Y2 \| C13) | −2.91567230E−06 |
| X * Y**3 (SCO XY3 \| C14) | 0.000000000E+00 |
| Y**4 (SCO Y4 \| C15) | −8.129645853E−07 |
| X**5 (SCO X5 \| C16) | 0.0000000000E+00 |
| X**4 * Y (SCO X4Y \| C17) | 1.4913830346E−09 |
| X**3 * Y**2 (SCO X3Y2 \| C18) | 0.0000000000E+00 |
| X**2 * Y**3 (SCO X2Y3 \| C19) | 2.4358316954E−09 |
| X * Y**4 (SCO XY4 \| C20) | 0.0000000000E+00 |
| Y**5 (SCO Y5 \| C21) | 4.1849942311E−09 |
| X**6 (SCO X6 \| C22) | −9.610954967E−10 |
| X**5 * Y (SCO X5Y \| C23) | 0.00000000000E+00 |
| X**4 * Y**2 (SCO X4Y2 \| C24) | 5.6221328063E−10 |
| X**3 * Y**3 (SCO X3Y3 \| C25) | 0.0000000000E+00 |
| X**2 * Y**4 (SCO X2Y4 \| C26) | 7.656820595E−10 |
| X * Y**5 (SCO XY5 \| C27) | 0.000000000E+00 |
| Y**6 (SCO Y6 \| C28) | −2.99368733E−09 |
| X**7 (SCO X7 \| C29) | 0.00000000000E+00 |
| X**6 * Y (SCO X6Y \| C30) | −4.2039898E−12 |
| X**5 * Y**2 (SCO X5Y2 \| C31) | 0.0000000000E+00 |
| X**4 * Y**3 (SCO X4Y3 \| C32) | −7.665313E−12 |
| X**3 * Y**4 (SCO X3Y4 \| C33) | 0.000000000E+00 |
| X**2 * Y**5 (SCO S2Y5 \| C34) | −1.546473120E−11 |
| X * Y**6 (SCO XY6 \| C35) | 0.000000000E+00 |
| Y**7 (SCO Y7 \| C36) | −2.36018874E−11 |
| X**8 (SCO X8 \| C37) | −1.08111832E−12 |
| X**7 * Y (SCO X7Y \| C38) | 0.00000000000E+00 |
| X**6 * Y**2 (SCO X6Y2 \| C39) | −9.9791583E−13 |
| X**5 * Y**3 (SCO X5Y3 \| C40) | 0.0000000000E+00 |
| X**4 * Y**4 (SCO X4Y4 \| C41) | −8.6526761E−12 |
| X**3 * Y**5 (SCO X3Y5 \| C42) | 0.00000000000E+00 |
| X**2 * Y**6 (SCO X2Y6 \| C43) | −3.9166253E−12 |
| X * Y**7 (SCO XY7 \| C44) | 0.00000000000E+00 |
| Y**8 (SCO Y8 \| C45) | 1.45724979E−11 |
| X**9 (SCO X9 \| C46) | 0.00000000000E+00 |
| X**8 * Y (SCO X8Y \| C47) | 3.51280116E−15 |
| X**7 * Y**2 (SCO X7Y2 \| C48) | 0.00000000000E+00 |
| X**6 * Y**3 (SCO X6Y3 \| C49) | 6.69288844E−15 |
| X**5 * Y**4 (SCO X5Y4 \| C50) | 0.00000000000E+00 |
| X**4 * Y**5 (SCO X4Y5 \| C51) | 6.15758388E−14 |
| X**3 * Y**6 (SCO X3Y6 \| C52) | 0.00000000000E+00 |

TABLE 5-continued

Optical surface prescription of surface 5 of the freeform corrector lens

| | |
|---|---|
| X**2 * Y**7 (SCO X2Y7 \| C53) | 1.94985620E−14 |
| X * Y**8 (SCO XY8 \| C54) | 0.00000000E+00 |
| Y**9 (SCO Y9 \| C55) | 4.24428256E−14 |
| X**10 (SCO X10 \| C56) | 9.43112860E−16 |
| X**9 * Y (SCO X9Y \| C57) | 0.00000000E+00 |
| X**8 * Y**2 (SCO X8Y2 \| C58) | 2.10137145E−15 |
| X**7 * Y**3 (SCO X7Y3 \| C59) | 0.00000000E+00 |
| X**6 * Y**4 (SCO X6Y4 \| C60) | 1.130922231E−14 |
| X**5 * Y**5 (SCO X5Y5 \| C61) | 0.000000000E+00 |
| X**4 * Y**6 (SCO X4Y6 \| C62) | −1.93900784E−15 |
| X**3 * Y**7 (SCO X3Y7 \| C63) | 0.000000000E+00 |
| X**2 * Y**8 (SCO X2Y8 \| C64) | 7.080929646E−15 |
| X * Y**9 (SCO XY9 \| C65) | 0.000000000E+00 |
| Y**10 (SCO Y10 \| C66) | −1.96970504E−14 |

On the display side of the exemplary design, the prism 510 provides a diagonal FOV of 46 degrees, or 40 degrees horizontally and 22 degrees vertically. It supports a microdisplay 520 with a pixel size of ~8 μm and a diagonal size of 0.9" or smaller. In the prototype that was fabricated, a 0.86" microdisplay with an aspect ratio of 16:9 and a resolution of 1920×1200 pixels was used.

Figure 10:
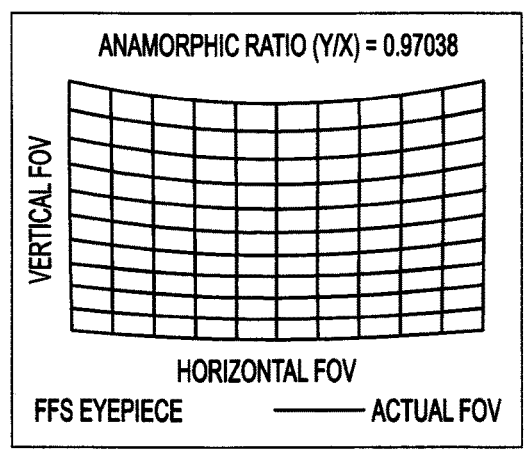
FIG. 10 illustrates the distortion grid across the field of view in the HMD virtual display path of the design of FIG. 6.

The exemplary design achieves high image contrast and resolution. FIGS. 9A-9D illustrate the polychromatic modulation transfer function (MTF) of 20 sampled fields across the field of view in the HMD path with a 4-mm centered pupil. The MTF curves demonstrate an average contrast of 0.2 at the cutoff resolution of 50 lps/mm (equivalent to a 10 μm pixel resolution) and an average contrast greater than 0.3 at the cutoff resolution of 35 lps/mm (equivalent of approximately 15-um pixel resolution). FIG. 10 further demonstrates the distortion grid of the virtual display path.

Figure 11:
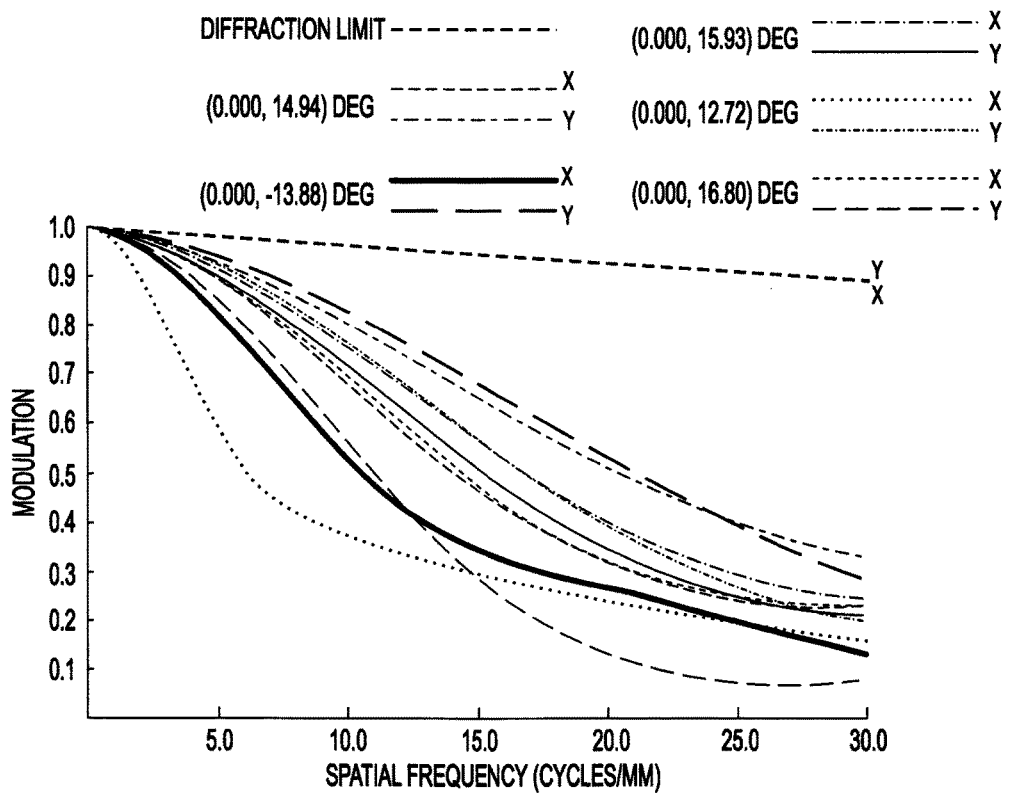
FIG. 11 illustrates the modulation transfer function of sampled fields across the field of view in the eye imaging path of the design of FIG. 6.
Figure 12:
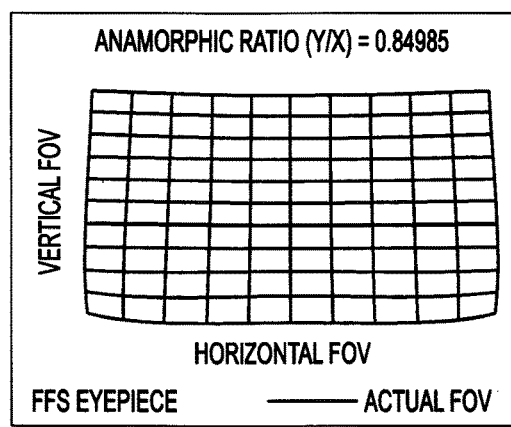
FIG. 12 illustrates the distortion grid across the field of view in the eye imaging path of the design of FIG. 6.
Figure 13A:
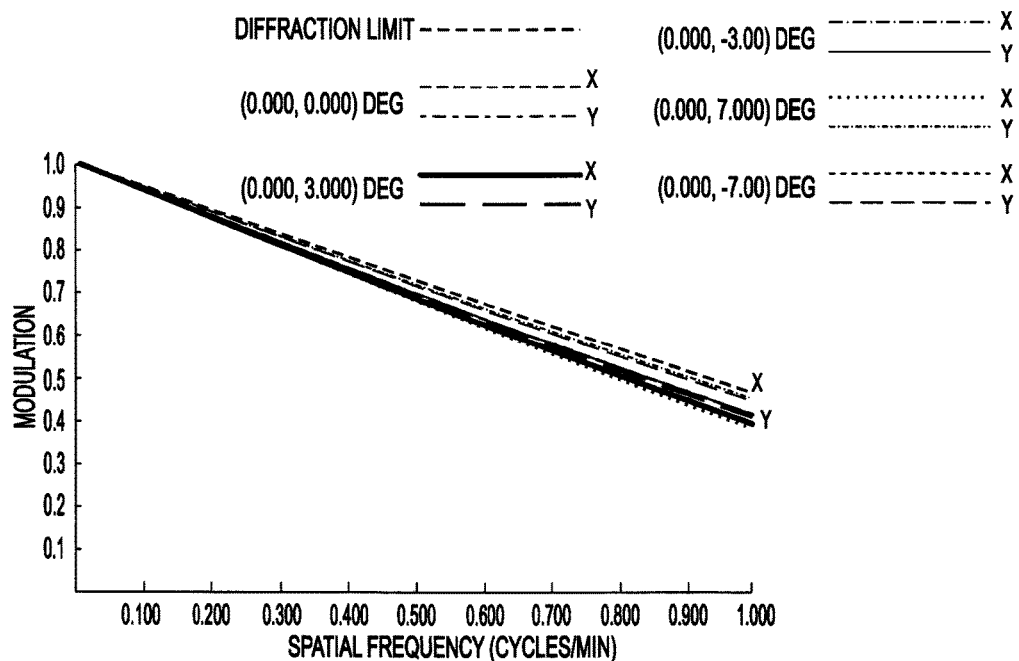
FIGS. 13A-13D illustrate the polychromatic modulation transfer function (MTF) of 20 sampled fields across the central field of view of 30×22 degrees in the HMD see-through path with a 4-mm centered pupil of the design of FIG. 6.
Figure 13B:
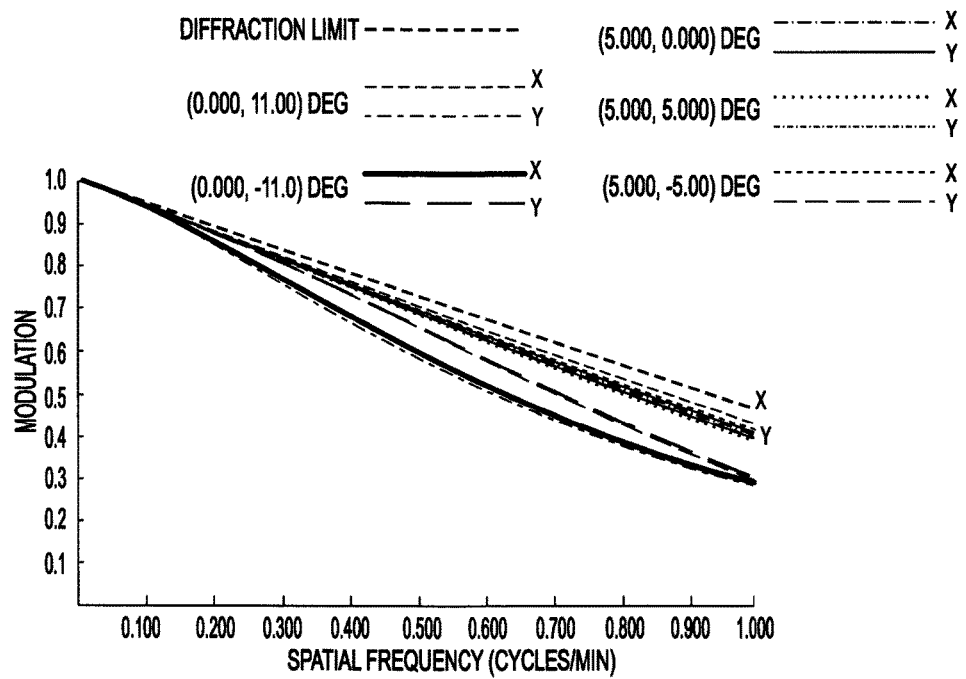
Figure 13C:
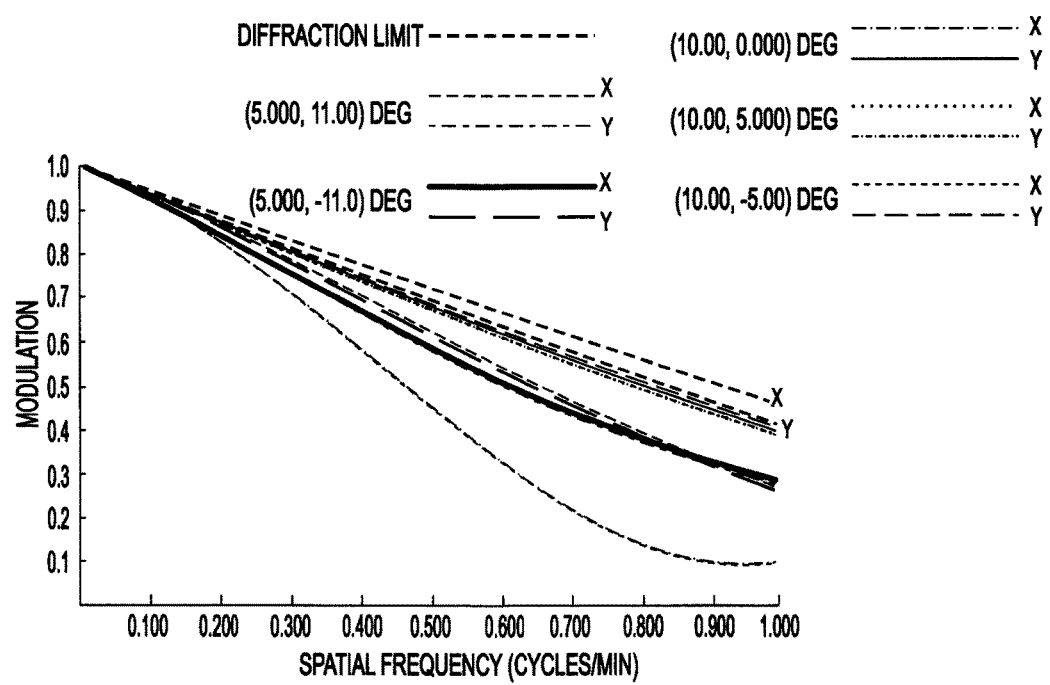
Figure 13D:
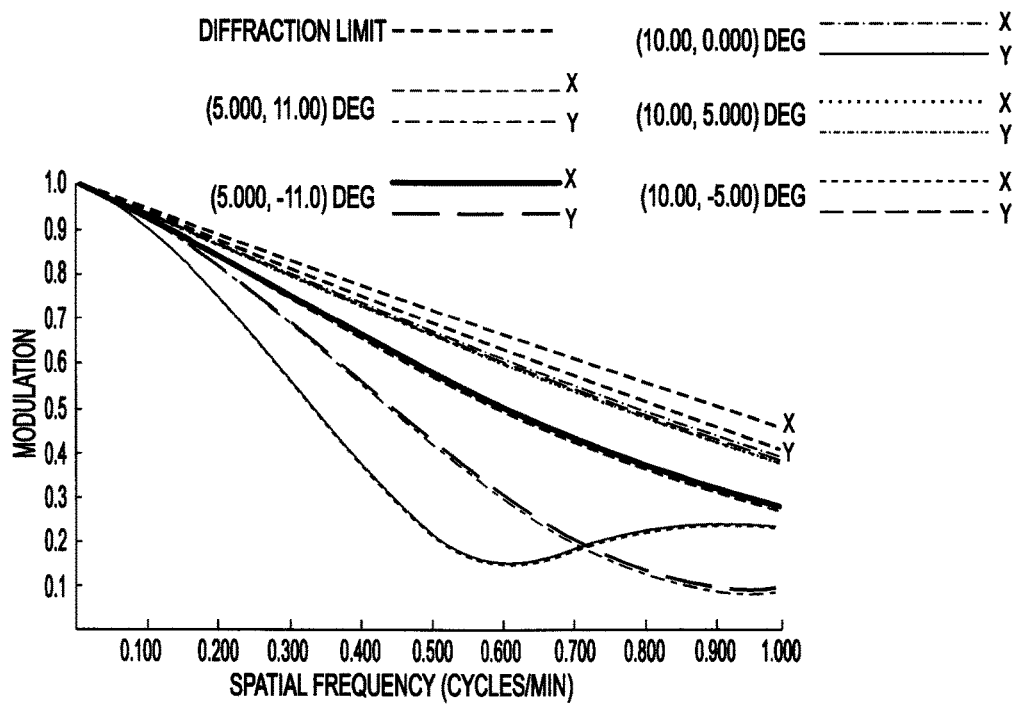

On the eye imaging and illumination side, one or more NIR LEDs 530 are placed around the image source to create a uniformly illuminated eye area through the freeform prism 510. The freeform prism 510 is able to provide uniform illumination for an eye area of approximately 30 mm×20 mm in the horizontal and vertical directions, respectively. The same illuminated eye area is captured by a high resolution NIR sensor 560. The imaged area is sufficient to allow eye movement tracking. The resolvable pixel size of the eye imaging path is about ~10 um. FIG. 11 illustrates the modulation transfer function (MTF) of the eye imaging path. The MTF curves demonstrate an average contrast of 0.1 at the cutoff resolution of 50 lps/mm (equivalent to a 10 μm pixel resolution) and an average contrast greater than 0.25 at the cutoff resolution of 30 lps/mm (equivalent of approximately 16-um pixel resolution). FIG. 12 further illustrates the distortion grid of the eye imaging path.

Figure 14:
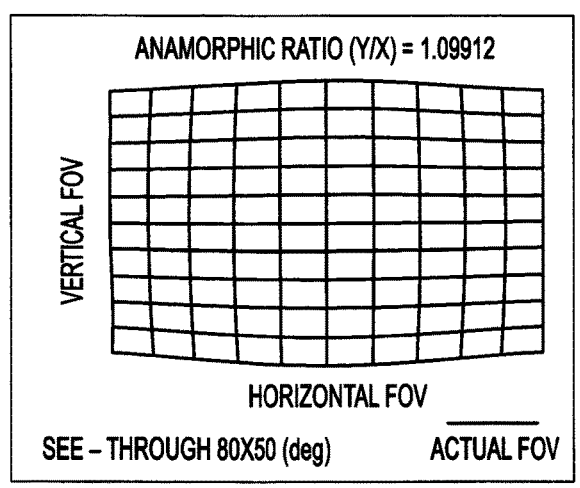
FIG. 14 illustrates the distortion grid across the field of view in the HMD see-through path of the design of FIG. 6.

On the see-through side of the system 500, the cemented prism 510 and freeform corrective lens 515 provide a diagonal FOV of approximately 100 degrees, or 80 degrees horizontally and 50 degrees vertically. The see-through FOV is designed to be much larger than the virtual display FOV for improved situational awareness. The eyebox size of the see-through system is optimized to be larger than the virtual display system to further improve ease of use and viewing comfort. This design embodiment achieves high image contrast and resolution. FIGS. 13A-13D illustrate the polychromatic modulation transfer function (MTF) of 20 sampled fields across the center 30×22 degrees of field of view in see-through path with a 4-mm centered pupil. The MTF curves demonstrate nearly diffraction limited performance. In FIGS. 13A-13D, 0.5 cycles/min corresponds to 1 minute of arc spatial resolution, which is the resolvability of 20/20 vision, and 1 cycles/min corresponds to 0.5 minute of arc spatial resolution, which is the resolvability of 20/15 vision. The average MTF across the sampled fields is greater than 0.5 at the cutoff resolution of 0.5 cycles/min (equivalent to 1 minute of arc angular resolution) and an average contrast greater than 0.4 at the cutoff resolution of 1 cycles/min (equivalent to 0.5 minutes of arc angular resolution). The average MTF across the entire 80×50 see-through FOV is greater than 0.35 at the cutoff frequency of 0.5 cycles/min. FIG. 14 further illustrates the distortion grid of the see-through display path across the entire FOV. The distortion in the central 40×22 degrees is less than 2% and the distortion across the whole field is less than 8%.

Example 2

Figure 15A:
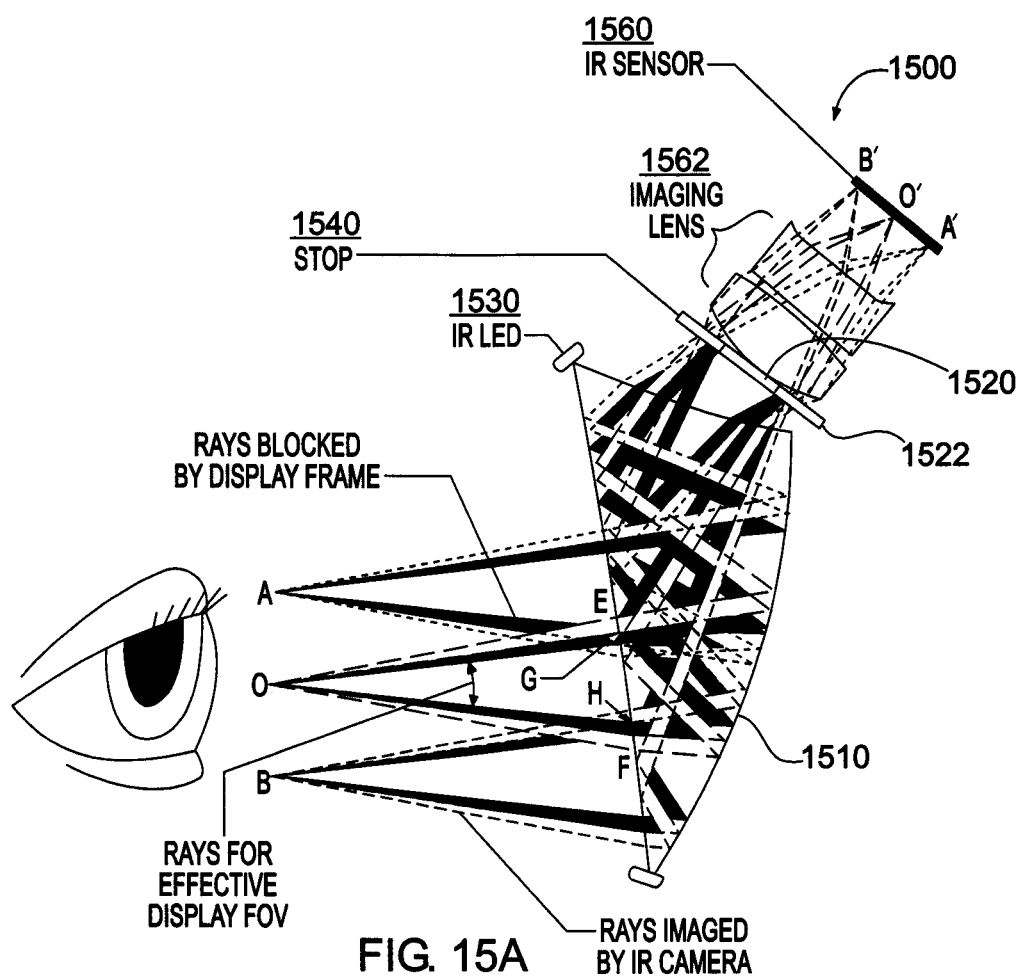
FIGS. 15A, 15B illustrate an exemplary design of the optical scheme shown in FIG. 3 in accordance with the present invention.
Figure 15B:
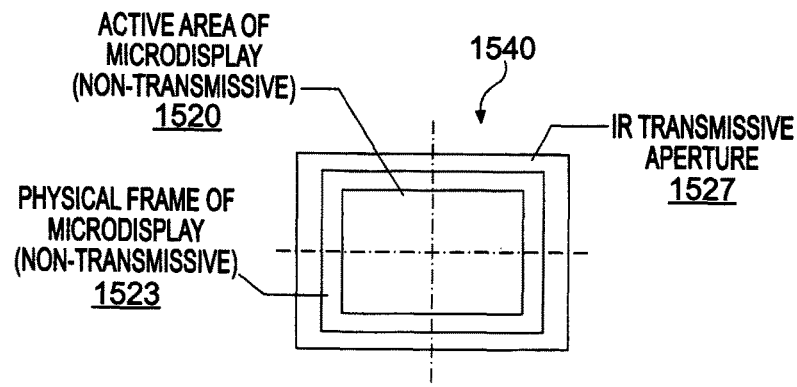

FIGS. 15A-15B schematically illustrate an exemplary design of a second configuration of the present invention, where the stop 1540 of the imaging system 1500 may surround the microdisplay 1520. The microdisplay plane is divided into three regions: an IR-transmissive area 1527 that allows collecting the rays by an IR sensor 1560 and which may serve as the stop 1540 for eye imaging on IR sensor 1560; the active area of the microdisplay 1520 (non-transmissive) corresponding to the active display area which blocks the IR rays from reaching the IR sensor 1560; and, a third non-transmissive frame 1523 between the IR transmissive and microdisplay areas corresponding to a physical frame of the microdisplay which also blocks the rays from reaching the IR sensor 1560. In the imaging system 1500 the respective optical axes of the prism 1510, microdisplay 1520, and IR sensor 1560 may be coaxial. As such, the IR sensor 1560 may be placed after the microdisplay 1520 to capture the image of the eye pupil. The distance from the IR sensor 1560 to the prism 1510 depends on the image location of the eye pupil through the freeform prism 1510, which ultimately depends on the design of the display path. For instance, if the freeform prism 1510 is designed to be telecentric or close to telecentric in the display space, the chief rays will be nearly parallel to each other and perpendicular to the microdisplay surface before they intersect with the microdisplay 1520. This means the image of the eye pupil through the prism 1510 is located at infinity or a significantly far distance. In this case, one or more additional imaging lenses 1562 may need to be inserted between the IR sensor 1560 and the prism 1510 to reduce the overall length of the eye imaging path and achieve good image quality, FIG. 15A.

On the other hand, if the freeform prism 1510 is designed to be non-telecentric (i.e., the chief rays will converge to a point at some short distance behind the prism 1510), the eye pupil is imaged at a fairly close distance by the prism 1510 and the IR sensor 1560 can be placed directly behind the prism 1510 without the need for additional imaging lenses 1562. In practice, the condition of telecentricity or near-telecentricity is often desirable when designing the display path because the virtual image appears to be more uniform across the entire FOV. This condition may be required when the microdisplay 1520 only emits or reflects light within a narrow angle (e.g. devices such as LCoS type microdisplays). When the microdisplay 1520 offers a wide emission angle (e.g. OLED), the telecentricity condition can be relaxed.

Figure 3B:
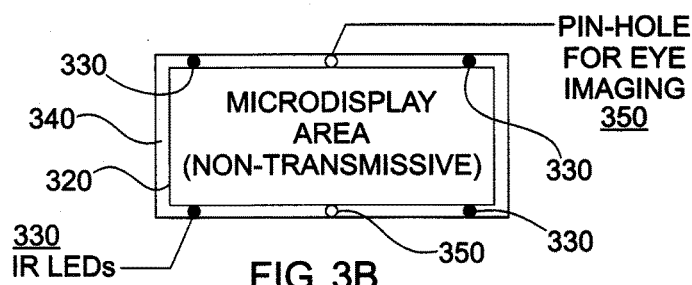
FIG. 3B schematically illustrates an exemplary system in accordance with the present invention of illumination units and eye imaging units disposed around a microdisplay panel.

The NIR LEDs may be placed around the stop 1540 in the similar way as described in FIG. 3B, or alternatively the NIR LEDs 1530 may be placed around the edge of the prism 1510 and directly illuminate the eye 10 as shown in FIG. 15A. Moreover, the NIR LEDs 1530 around the edge of the prism 1510 to directly illuminate the eye 10 without use of the prism 1530 may be implemented in any other configuration of the invention, including those depicted in FIGS. 5A-6 or 16, for example.

Example 3

Figure 16:
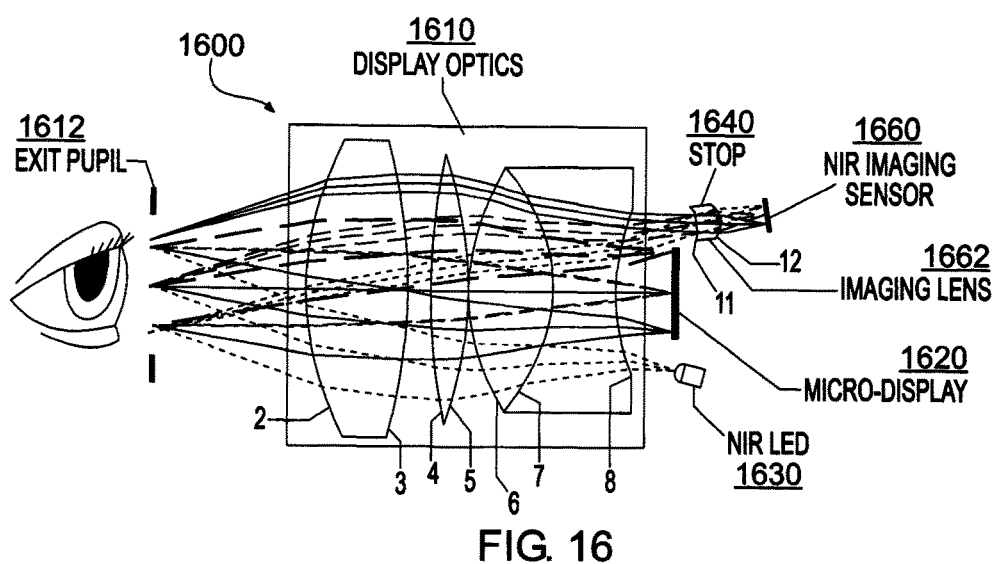
FIG. 16 schematically illustrates an exemplary implementation of the optical scheme shown in FIG. 3 in accordance with the present invention based on rotationally symmetric optics.

FIG. 16 schematically illustrates an exemplary design 1600 of the optical scheme shown in FIG. 3 utilizing on rotationally symmetric optics for the core optics 310. Instead of using a compact freeform based prism 510, a four-element viewing optics 1610 is used as the core optics 310 for display viewing, eye imaging and eye illumination. The microdisplay 1620 may be placed at the focal plane of the optics 1610. One light source 1630 (such as an NIR-LED) may be placed around the image source 1620. A pinhole-like stop 1640 and micro-imaging lens 1662 may also be placed around the edge of the image source 1620 to form eye images on the imaging sensor 1660. Additional light sources 1630 and imaging subsystems (micro-imaging lens 1662 and imaging sensors 1660) can be arranged around the image source 1620 as needed for different applications. In the exemplary design 1600 the respective optical axes of the display optics 1610 and microdisplay 1620 maybe coaxial, while the respective optical axes of one or more of the image sensor 1660, light source 1630, and microdisplay 1620 may be tilted and/or decentered relative to one another. As with the freeform configurations, at the surface closest to the microdisplay 1620, surface 8, the illumination path, eye imaging path, and display path impinge upon differing respective portions of surface 8, though partial overlap is permitted, e.g., as illustrated between the imaging path and display path.

The viewing optics 1610 can provide a diagonal FOV of 40 degrees, 20-mm eye-relief and 10-mm eye-pupil size, and can support an image source 1620 with a diagonal size of 0.8" or smaller. One or more NIR LEDs 1630 may be placed around the microdisplay 1620 to create a uniformly illuminated eye area through the viewing optics. The viewing optics 1610 is able to provide uniform illumination for an eye area of approximately 15 mm×15 mm. The same illuminated eye area may be captured by a high resolution NIR sensor 1630. The imaged area is sufficient to allow eye movement tracking.

An exemplary optical prescription of the design 1600 is provided in Tables 6-9.

TABLE 6

Optical surface prescription of the viewing optics 1610

| SURFACE NUMBER | SURFACE TYPE | RADIUS (MM) | THICKNESS (MM) | MATERIAL |
|---|---|---|---|---|
| OBJECT | | INFINITY | INFINITY | AIR |
| 1 (STOP) | | 0 | 20 | AIR |
| 2 | SPHERE | 38.747568 | 13 | ACRYLIC |
| 3 | SPHERE | −68.038477 | 2.940552 | AIR |
| 4 | SPHERE | 87.660626 | 4.795025 | ACRYLIC |
| 5 | SPHERE | −52.591345 | 0.1 | AIR |
| 6 | SPHERE | 29.845125 | 10.782261 | NBK7 |
| 7 | SPHERE | −23.016798 | 8 | SF61 |
| 8 | SPHERE | 30.000017 | 7.076910 | AIR |
| 9 (MICRODISPLAY) | | INFINITY | 0 | |

TABLE 7

Optical surface prescription of the imaging lens 1662

| SURFACE NUMBER | SURFACE TYPE | RADIUS (MM) | THICKNESS (MM) | MATERIAL |
|---|---|---|---|---|
| 10 (STOP) | | INFINITY | INFINITY | AIR |
| 11 | ASPHERE | 41.495014 | 3.183189 | ACRYLIC |
| 12 | ASPHERE | −2.858167 | 5.988505 | AIR |
| 13 (IR SENSOR) | | INFINITY | 0 | |

DECENTER COORDINATES OF SURFACE 10 (STOP) RELATIVE TO SURFACE 8

| Y DECENTER (MM) | Z DECENTER | X TILT (ADE) |
|---|---|---|
| 8.7401084 | 3 | 8.3216381 |

Surfaces 11 and 12 may be aspheric surfaces with the sag of the aspheric surface defined by:

$$z = \frac{cr^2}{1+\sqrt{1-(1+K)c^2r^2}} + Ar^4 + Br^6 + Cr^8 + Dr^{10} + Er^{12} + Fr^{14} + Gr^{16} + Hr^{18} + Jr^{20},$$

where z is the sag of the surface measured along the z-axis of a local x, y, z coordinate system, c is the vertex curvature, k is the conic constant, A through J are the 4th, 6th, 8th, 10th, 12th, 14th, 16th, 18th, and 20th order deformation coefficients, respectively.

TABLE 8

Optical surface prescription of surface 11 of the imaging lens

| Y Radius | 41.495014 |
|---|---|
| Conic Constant (K) | −20 |
| 4th Order Coefficient (A) | −1.021763E−02 |
| 6th Order Coefficient (B) | −6.885433E−04 |
| 8th Order Coefficient (C) | −3.263238E−04 |
| 10th Order Coefficient (D) | 0 |

TABLE 9

Optical surface prescription of surface 12 of the imaging lens

| Y Radius | −2.858167 |
|---|---|
| Conic Constant (K) | −1.750218 |
| 4th Order Coefficient (A) | −7.851177E−03 |
| 6th Order Coefficient (B) | −1.064232E−04 |
| 8th Order Coefficient (C) | −4.912295E−05 |
| 10th Order Coefficient (D) | 0 |

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An eye-tracked head-mounted display, comprising:
   a micro-display for generating an image to be viewed by a user, the micro-display having a display optical path and an exit pupil associated therewith;
   a first plane located at the micro-display and a second plane located at the exit pupil;
   an image sensor configured to receive reflected optical radiation from the exit pupil reflected from a user's eye positioned thereat, the image sensor having a sensor optical path associated therewith;
   an illumination source for generating optical radiation and configured to illuminate the exit pupil to effect illumination of the user's eye, the illumination source having an illumination optical path associated therewith, wherein the illumination source is located proximate the first plane; and
   display optics disposed in optical communication with 1) the micro-display along the display optical path, 2) the illumination source along the illumination optical path, and 3) the image sensor along the sensor optical path, the display optics having a selected surface closest to the micro-display and the image sensor, the display optics positioned to receive radiation from the illumination source and from the micro-display and transmit the radiation received from the illumination source and the micro-display to the exit pupil,
   wherein the display optical path and sensor optical path each comprise respective optical axes at the display optics and image sensor, respectively, and wherein the optical axes are tilted relative to one another at the exit pupil.

2. The eye-tracked head-mounted display according to claim 1, wherein the display and image sensor optical paths partially overlap at the selected surface.

3. The eye-tracked head-mounted display according to claim 1, wherein the display optics is configured to create a virtual image of the micro-display for viewing at the exit pupil.

4. The eye-tracked head-mounted display according to claim 1, wherein the display optical path comprises an optical axis, and wherein the image sensor is located off the optical axis of the display optical path.

5. The eye-tracked head-mounted display according to claim 1, wherein the display optical path comprises an optical axis, and wherein the image sensor is located on the optical axis of the display optical path.

6. The eye-tracked head-mounted display according to claim 1, comprising a stop at the first plane, the stop having at least one aperture therein disposed at a location along the sensor optical path.

7. The eye-tracked head-mounted display according to claim 6, wherein the at least one aperture comprises a pin-hole.

8. The eye-tracked head-mounted display according to claim 1, comprising a stop having at least one aperture therein disposed at a location along the sensor optical path between the sensor and selected surface.

9. The eye-tracked head-mounted display according to claim 1, wherein the display optics comprises a freeform optical element.

10. The eye-tracked head-mounted display according to claim 1, wherein the display optics comprises a rotationally symmetric optical element.

11. The eye-tracked head-mounted display according to claim 1, wherein the display optics comprises a freeform optical prism.

12. The eye-tracked head-mounted display according to claim 11, wherein the prism comprises a wedge-shaped prism.

13. The eye-tracked head-mounted display according to claim 11, wherein the prism comprises an aspheric surface.

14. The eye-tracked head-mounted display according to claim 11, wherein the prism is telecentric in display space.

15. The eye-tracked head-mounted display according to claim 11, wherein the prism is non-telecentric in display space.

16. The eye-tracked head-mounted display according to claim 11, wherein the prism comprises a TIR (total internal reflection) surface oriented to receive and totally internally reflect light from the micro-display.

17. The eye-tracked head-mounted display according to claim 11, wherein the prism comprises a TIR (total internal reflection) surface oriented to totally internally reflect light to the image sensor.

18. The eye-tracked head-mounted display according to claim 11, comprising a freeform corrective lens in optical communication with the prism.

19. The eye-tracked head-mounted display according to claim 18, wherein field of view of the corrective lens is larger than a field of view of the display optics.

20. The eye-tracked head-mounted display according to claim 1, wherein the display optics comprise a half-mirrored surface.

21. The eye-tracked head-mounted display according to claim 1, wherein the illumination source comprises a plurality of light emitting diodes.

22. The eye-tracked head-mounted display according to claim 1, wherein the display optics is configured to collimate the optical radiation from the illumination source.

23. The eye-tracked head-mounted display according to claim 1, wherein the display optical path of the display optics comprises an optical axis and the illumination source is located off the optical axis.

24. The eye-tracked head-mounted display according to claim 1, wherein the prism comprises a TIR (total internal reflection) surface oriented to receive and totally internally reflect radiation from the illumination source.

* * * * *